US012791846B2

(12) United States Patent
Ozcan et al.

(10) Patent No.: US 12,791,846 B2
(45) Date of Patent: Nov. 10, 2026

(54) DIFFRACTIVE ALL-OPTICAL COMPUTING FOR QUANTITATIVE PHASE IMAGING

(71) Applicant: THE REGENTS OF THE UNIVERSITY OF CALIFORNIA, Oakland, CA (US)

(72) Inventors: Aydogan Ozcan, Los Angeles, CA (US); Deniz Mengu, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 244 days.

(21) Appl. No.: 18/721,509

(22) PCT Filed: Jan. 13, 2023

(86) PCT No.: PCT/US2023/060685
§ 371 (c)(1),
(2) Date: Jun. 18, 2024

(87) PCT Pub. No.: WO2023/141403
PCT Pub. Date: Jul. 27, 2023

(65) Prior Publication Data

US 2025/0138296 A1 May 1, 2025

Related U.S. Application Data

(60) Provisional application No. 63/301,838, filed on Jan. 21, 2022.

(51) Int. Cl.
*G02B 21/14* (2006.01)
*G02B 27/42* (2006.01)
*G02B 27/52* (2006.01)

(52) U.S. Cl.
CPC ......... *G02B 21/14* (2013.01); *G02B 27/4272* (2013.01); *G02B 27/52* (2013.01)

(58) Field of Classification Search
CPC ........ G02F 3/00; G06N 3/0675; G06N 20/00; G06N 3/08; G06N 3/02; G06N 3/04;
(Continued)

(56) References Cited

U.S. PATENT DOCUMENTS 11,392,830 B2 7/2022 Ozcan et al.
11,694,082 B2 7/2023 Ozcan et al.
(Continued)

FOREIGN PATENT DOCUMENTS

WO WO 2019/200289 A1 10/2019
WO WO 2020/247828 A1 12/2020
(Continued)

OTHER PUBLICATIONS

Deniz Mengu et al., Diffractive all-optical computing for quantitative phase imaging, arXiv:2201.08964 [physics. optics] published online, Jan. 22, 2022 (Jan. 22, 2022) [online] URL:https://arxiv.org/abs/2201.08964<DOI:10.48550/arxiv.2201.08964>.
(Continued)

*Primary Examiner* — Arnel C Lavarias
(74) *Attorney, Agent, or Firm* — VISTA IP LAW GROUP LLP

(57) ABSTRACT

Quantitative phase imaging (QPI) is a label-free computational imaging technique that provides optical path length information of objects. Here, a diffractive QPI network architecture is disclosed that can synthesize the quantitative phase image of an object by converting the input phase information of a scene or object(s) into intensity variations at the output plane. A diffractive QPI network is a specialized all-optical device designed to perform a quantitative phase-to-intensity transformation through passive diffrac-
(Continued)

tive/reflective surfaces that are spatially engineered using deep learning and image data. Forming a compact, all-optical network that axially extends only ~200-300λ (λ=illumination wavelength), this framework replaces traditional QPI systems and related digital computational burdens with a set of passive substrate layers. All-optical diffractive QPI networks can potentially enable power-efficient, high frame-rate and compact phase imaging systems that might be useful for various applications, including, e.g., on-chip microscopy and sensing.

15 Claims, 21 Drawing Sheets

(58) Field of Classification Search
CPC .......... G06N 3/042; G06N 3/06; G06N 3/067; G02B 27/4277; G02B 5/18; G02B 2005/1804; G02B 5/1828; G02B 5/1861; G02B 5/1866; G02B 5/1871; G02B 5/1876; G02B 5/188; G02B 27/00; G02B 27/0012; G02B 27/42; G02B 27/4233; G02B 27/4272; G02B 27/44
USPC ....... 359/572, 107, 558, 566, 569, 573, 576; 706/12, 15, 16, 20, 25, 26, 27
See application file for complete search history.

(56) References Cited

U.S. PATENT DOCUMENTS

| | | | |
|---|---|---|---|
| 12,443,838 B2* | 10/2025 | Ozcan | G06N 3/08 |
| 2013/0286400 A1 | 10/2013 | Kim et al. | |
| 2020/0394794 A1* | 12/2020 | Park | G06T 7/0012 |
| 2021/0142170 A1 | 5/2021 | Ozcan et al. | |
| 2022/0253685 A1 | 8/2022 | Ozcan et al. | |
| 2022/0327371 A1 | 10/2022 | Ozcan et al. | |
| 2023/0024787 A1 | 1/2023 | Ozcan et al. | |
| 2023/0153600 A1 | 5/2023 | Ozcan et al. | |
| 2023/0162016 A1 | 5/2023 | Ozcan et al. | |
| 2023/0251189 A1 | 8/2023 | Ozcan et al. | |
| 2023/0401436 A1 | 12/2023 | Ozcan et al. | |
| 2026/0038257 A1* | 2/2026 | Ozcan | G06V 10/14 |

FOREIGN PATENT DOCUMENTS

| | | | |
|---|---|---|---|
| WO | WO 2021/050550 A1 | 3/2021 | |
| WO | WO 2021/237170 A1 | 11/2021 | |
| WO | WO-2021231139 A1 * | 11/2021 | G06N 3/09 |
| WO | WO 2022/006018 A1 | 1/2022 | |
| WO | WO 2022/056422 A1 | 3/2022 | |
| WO | WO 2022/087345 A1 | 4/2022 | |
| WO | WO 2023/287586 A1 | 1/2023 | |
| WO | WO 2023/141403 A1 | 7/2023 | |
| WO | WO 2023/183859 A1 | 9/2023 | |
| WO | WO 2023/230412 A1 | 11/2023 | |

OTHER PUBLICATIONS

PCT International Search Report and Written Opinion for PCT/US2023/060685, Applicant: The Regents of the University of California, dated Jun. 14, 2023 (8 pages).

Onur Kulce et al., All-optical synthesis of an arbitrary linear transformation using diffractive surfaces, Light: Science & Applications, (2021), 10:196; https://doi.org/10.1038/s41377-021-00623-5.

Onur Kulce et al., All-optical information-processing capacity of diffractive surfaces, Light: Science & Applications, (2021), 10:25; https://doi.org/10.1038/s41377-020-00439-9.

Jingxi Li et al., Spectrally encoded single-pixel machine vision using diffractive networks, Sci. Adv. 2021; 7: eabd7690.

Xing Lin et al., All-optical machine learning using diffractive deep neural networks, Science 361, 1004-1008 (2018).

Yi Luo et al., Design of task-specific optical systems using broadband diffractive neural networks, Light: Science & Applications, (2019), 8:112, https://doi.org/10.1038/s41377-019-0223-1.

Deniz Mengu et al., Analysis of Diffractive Optical Neural Networks and Their Integration With Electronic Neural Networks, IEEE Journal of Selected Topics in Quantum Electronics, vol. 26, No. 1, Jan./Feb. 2020.

Deniz Mengu et al., Misalignment resilient diffractive optical networks, Nanophotonics 2020; 9(13): 4207-4219.

PCT International Preliminary Report on Patentability (Chapter I of the Patent Cooperation Treaty) for PCT/US2023/060685, Applicant: The Regents of the University of California, Form PCT/IB/326 and 373, dated Aug. 8, 2024 (7 pages).

The extended European search report dated Apr. 3, 2025 for European Patent Appl. No. 23743848.6 (8 pages).

Response to the extended European search report dated Oct. 21, 2025 for European Patent Appl. No. 23743848.6 (69 pages).

Md Sadman Sakib Rahman et al., Computer-free, all-optical reconstruction of holograms using diffractive networks, Arxiv.Org, Cornell University Library, 201 Olin Library Cornell University Itchaca, NY 14853, Jul. 17, 2021, XP091012767.

* cited by examiner

DIFFRACTIVE ALL-OPTICAL COMPUTING FOR QUANTITATIVE PHASE IMAGING

RELATED APPLICATION

This Application is a U.S. National Stage filing under 35 U.S.C. § 371 of International Application No. PCT/US2023/060685, filed on Jan. 13, 2023, which claims priority to U.S. Provisional Patent Application No. 63/301,838 filed on Jan. 21, 2022, which are hereby incorporated by reference. Priority is claimed pursuant to 35 U.S.C. §§ 119, 371 and any other applicable statute.

STATEMENT REGARDING FEDERALLY SPONSORED RESEARCH AND DEVELOPMENT

This invention was made with government support under N00014-18-1-2155, N00014-22-1-2016 awarded by the Office of Naval Research. The government has certain rights in the invention.

TECHNICAL FIELD

The technical field generally relates to diffractive optical networks used for Quantitative Phase Imaging (QPI). More specifically, the technical field relates to all-optical diffractive QPI networks that replace traditional QPI systems and related digital computation burdens associated with them.

BACKGROUND

Optical imaging of weakly scattering phase objects has been of significant interest for decades, resulting in numerous applications in different fields. For example, the optical examination of cells and tissue samples is frequently used in biological research and medical applications, including disease diagnosis. However, in terms of their optical properties, isolated cells and thin tissue sections (before staining) can be classified as weakly scattering, transparent objects. Hence, when they interact with the incident light in an optical imaging system, the amount of light scattered due to the spatial inhomogeneity of the refractive index is much smaller than the light directly passing through, resulting in a poor image contrast at the output intensity pattern. One way to circumvent this limitation is to convert such phase objects into amplitude-modulated samples using chemical stains or tags. In fact, for over a century, histopathology practice has relied on the staining of biological samples for medical diagnosis to bring contrast to various features of the specimen. While these methods generally provide high-contrast imaging (sometimes with molecular specificity), they are tedious and costly to perform, often involving toxic chemicals and lengthy manual staining procedures. Moreover, the use of exogenous stains might cause changes in the physiology of living cells and tissue, creating practical limitations in various biological applications.

The phase contrast imaging principle, invented by Frits Zernike, represents a breakthrough (leading to the 1953 Nobel Prize in Physics) on imaging the intrinsic optical phase delay induced by transparent, phase objects without using exogenous agents. Nomarski's differential interference contrast (DIC) microscopy is another method frequently used to investigate phase objects without staining. While both phase contrast imaging and DIC microscopy can offer sensitivity to nanoscale optical path length variations, they reveal the phase information of the specimen in a qualitative manner. On the other hand, quantification and mapping of a sample's phase shift information with high sensitivity and resolution allows for various biomedical applications. To address this broad need, quantitative phase imaging (QPI) has emerged as a powerful, label-free approach for optical examination of, e.g., morphology and spatiotemporal dynamics of transparent specimens. The last decades have witnessed the development of numerous digital QPI methods, e.g., Fourier Phase Microscopy (FPM), Hilbert Phase Microscopy (HPM), Digital Holographic Microscopy (DHM), Quadriwave Lateral Shearing Interferometer (QLSI) and many others. This transformative progress in QPI methods has fostered various applications in, e.g., pathology, cell migration dynamics and growth, immunology and cancer prognosis, among others.

A QPI system, in general, consists of an optical imaging instrument based on conventional components such as lenses, beamsplitters, as well as a computer to run the image reconstruction algorithm that recovers the object phase function from the recorded interferometric measurements. In recent years, QPI methods have also benefited from the ongoing advances in machine learning and GPU-based computing to improve their digital reconstruction speed and spatiotemporal throughput. For example, it has been shown that feedforward deep neural networks can be used for solving challenging inverse problems in QPI systems, including, e.g., phase retrieval, pixel super-resolution and extension of the depth-of-field. Improved QPI systems are, however, needed.

SUMMARY

In one embodiment, a diffractive optical network is disclosed that can be used to replace digital image reconstruction algorithms used in QPI systems with a series of passive optical modulation layers or surfaces that are spatially engineered using deep learning. The passive optical modulation surfaces may be used to transmit light therethrough or reflect light therefrom. The presented QPI diffractive networks have a compact footprint that axially spans ~240λ, in embodiment, and are designed using deep learning to encode the optical path length induced by a given input phase object into an output intensity distribution that all-optically reveals the corresponding QPI information of the objects or sample. Numerical simulations that model the physical QPI diffractive network establish that these QPI diffractive network designs can generalize not only to unseen, new phase images that statistically resemble the training image dataset, but also generalize to entirely new datasets with different object features.

It is important to emphasize that these QPI diffractive networks do not perform phase recovery from an intensity measurement or a hologram. In fact, the input information is the phase object itself, and the QPI network is trained to convert this phase information of the input scene into an intensity distribution at the output plane; this way, the normalized output intensity image directly reveals the quantitative phase image of the sample in radians. The diffractive QPI framework and the QPI networks reported herein represent actual demonstrations of a new phase imaging concept, and it is believed that such diffractive computational phase imagers can find various applications in on-chip microscopy and sensing due to their compact footprint, all-optical computation speed and low-power operation.

In another embodiment, a diffractive Quantitative Phase Imaging (QPI) network is disclosed for imaging a phase object or a sample containing a phase distribution or phase information. The QPI network includes one or more optically transmissive and/or reflective substrate layer(s) arranged in an optical path, each of the optically transmissive and/or reflective substrate layer(s) comprising a plurality of physical features formed on or within the one or more optically transmissive or reflective substrate layer(s) and having different transmission and/or reflection coefficients or parameters as a function of the lateral coordinates across each substrate layer, wherein the one or more optically transmissive and/or reflective substrate layer(s) and the plurality of physical features thereon collectively define a trained mapping function between an input optical field from the phase object or sample to an output intensity image created by optical diffraction through the optically transmissive layer(s) and/or from the reflective substrate layer(s). An image sensor is part of the QPI network and is configured to capture the output intensity image. The one or more optically transmissive and/or reflective substrate layer(s) are designed during a digital training phase to define the plurality of physical features formed on or within the one or more optically transmissive or reflective substrate layer(s) such that the output intensity image reveals the quantitative phase information of the input optical field created by optical diffraction through the optically transmissive substrate layer(s) and/or diffraction from the reflective substrate layer(s).

In another embodiment, a method of performing quantitative phase imaging includes inputting an optical field of a phase object or sample containing a phase distribution or phase information into a diffractive Quantitative Phase Imaging (QPI) network that includes one or more optically transmissive and/or reflective substrate layer(s) arranged in an optical path, each of the of optically transmissive and/or reflective substrate layer(s) comprising a plurality of physical features formed on or within the one or more optically transmissive or reflective substrate layer(s) and having different transmission and/or reflection coefficients or parameters as a function of the lateral coordinates across each substrate layer, wherein the one or more optically transmissive and/or reflective substrate layer(s) and the plurality of physical features thereon collectively define a trained mapping function between an input optical field from the phase object or sample to an output intensity image created by optical diffraction through the optically transmissive substrate layer(s) and/or diffraction from the reflective substrate layer(s). The one or more optically transmissive and/or reflective substrate layer(s) are designed during a digital training phase to define the plurality of physical features formed on or within the one or more optically transmissive or reflective substrate layer(s) such that the output intensity image reveals the quantitative phase information of the input optical field created by optical diffraction through the optically transmissive substrate layer(s) and/or diffraction from the reflective substrate layer(s). The output intensity image is then captured with an image sensor.

BRIEF DESCRIPTION OF THE DRAWINGS

FIG. 4A illustrates the phase profiles of the diffractive layers forming the diffractive QPI network trained using phase-encoded images from Tiny-Imagenet dataset, $\phi(x,y)$. FIG. 4B shows exemplary input object images and the corresponding output QPI signals for the test images, never seen by the network during training, taken from the Tiny-Imagenet. Dashed box indicates that the test images, although not seen by the diffractive network before, belong to the same dataset used in the training. FIGS. 4C and 4D are the same as FIG. 4B, except that the test images are taken from CIFAR-10 and Fashion-MNIST. Dashed boxes indicate that these test images are from entirely new datasets compared to the Tiny-Imagenet used in the training. The SSIM (PSNR) values achieved by the presented diffractive network are 0.824±0.050 (26.43 dB±2.69), 0.917±0.041 (31.98 dB±3.15) and 0.596±0.116 (26.94 dB±1.5) for the test images from Tiny-Imagenet, CIFAR-10 and Fashion-MNIST datasets, respectively.

FIG. 5A shows the input phase image and the corresponding output diffractive QPI signal for binary, 0-π phase encoded grating objects. The diffractive QPI network can resolve features as small as ~0.67λ. FIG. 5B illustrates and analysis of the relationship between the input phase contrast and the resolvable feature size. The diffractive QPI network can resolve 0.67λ linewidth for a phase encoding range that is larger than 0.25π. Below this phase contrast, the resolution slowly degrades; for example, at 0-0.1π phase encoding, the background noise shadows the QPI signal of the grating with a linewidth of 0.67λ, while a larger linewidth (0.73λ) grating is still partially resolvable.

FIG. 6A is a schematic of the diffractive QPI network that was trained with $\alpha_{tr}=1.0$, meaning that the training images had [0:π] phase range. FIG. 6B shows pairs of ground-truth input phase images (top rows) and the diffractive QPI signal (bottom rows) for different images taken from Tiny-Imagenet (top), CIFAR-10 (middle) and Fashion-MNIST (bottom), at different levels of phase encoding ranges dictated by (from left-to-right) $\alpha_{test}=2$, $\alpha_{test}=1.75$, $\alpha_{test}=1.5$, $\alpha_{test}=1.25$, $\alpha_{test}=\alpha_{tr}=1.0$, $\alpha_{test}=0.75$, $\alpha_{test}=0.5$, $\alpha_{test}=0.25$, $\alpha_{test}=0.1$. FIG. 6C shows graphs of the SSIM and PSNR values of the diffractive QPI signals with respect to the ground-truth images as a function of $\alpha_{test}$.

FIG. 12A is a schematic of the diffractive QPI network that was trained with $\pi_{tr}$=2.0, meaning that the training images had [0:2$\pi$] phase range. FIG. 12B shows pairs of ground-truth input phase images (top rows) and the diffractive QPI signal (bottom rows) for different images taken from Tiny-Imagenet (top), CIFAR-10 (middle) and Fashion-MNIST (bottom), at different levels of phase encoding ranges dictated by (from left-to-right) $\alpha_{test}$=2, $\alpha_{test}$=1.75, $\alpha_{test}$=1.5, $\alpha_{test}$=1.25, $\alpha_{test}$=$\alpha_{tr}$=1.0, $\alpha_{test}$=0.75, $\alpha_{test}$=0.5, $\alpha_{test}$=0.25, $\alpha_{test}$=0.1. FIG. 12C shows graphs of the SSIM and PSNR values of the diffractive QPI signals with respect to the ground-truth images as a function of $\alpha_{test}$.

FIG. 14A shows the output diffraction efficiency and SSIM as a function of K. There are five (5) different diffractive QPI network designs reported here, with K=1, 2, 3, 4 and 5 trainable, phase-only diffractive surfaces; the K=5 diffractive QPI network is the same one shown in FIG. 4A. FIG. 14B illustrates exemplary input object images from Tiny-Imagenet (top-2 rows), CIFAR-10 (middle-2 rows) and Fashion-MNIST (bottom-2 rows) and the corresponding output QPI signals synthesized by the diffractive QPI network designs with K=1, 2, 3, 4 and 5.

DETAILED DESCRIPTION OF ILLUSTRATED EMBODIMENTS

Figure 1:
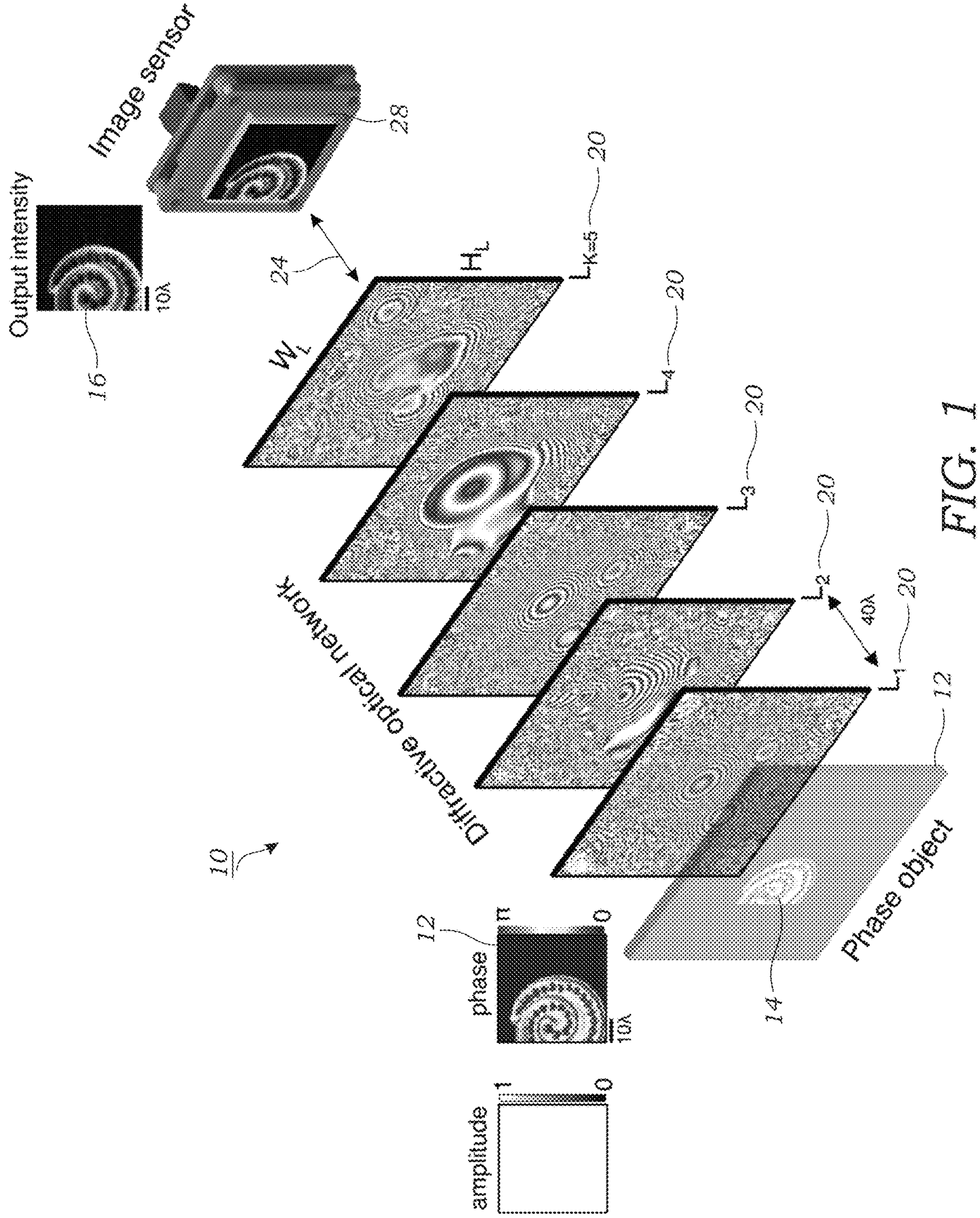
FIG. 1 is a schematic of a diffractive QPI network that converts the optical phase information of an input object (i.e., phase object) and/or input optical field into a normalized intensity image, revealing the QPI information in radians without the use of a computer or a digital image reconstruction algorithm. Optical layout of the presented 5-layer diffractive QPI network, where the total distance between the input and output fields-of-view is 240λ.
Figure 2:
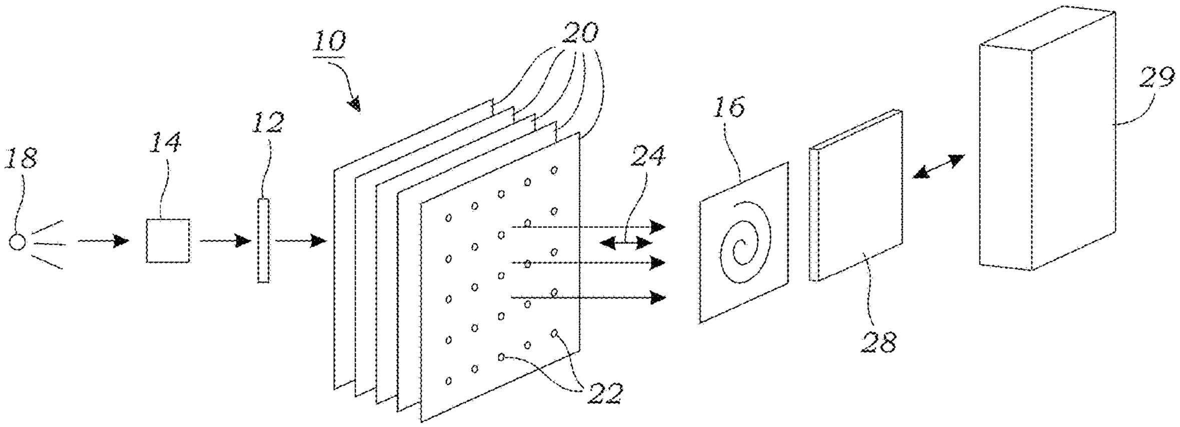
FIG. 2 schematically illustrates a QPI network operating in transmission mode. An input optical field of an object passes through a plurality of optically transmissive layers and generates an intensity image that is captured by an image sensor.
Figure 3:
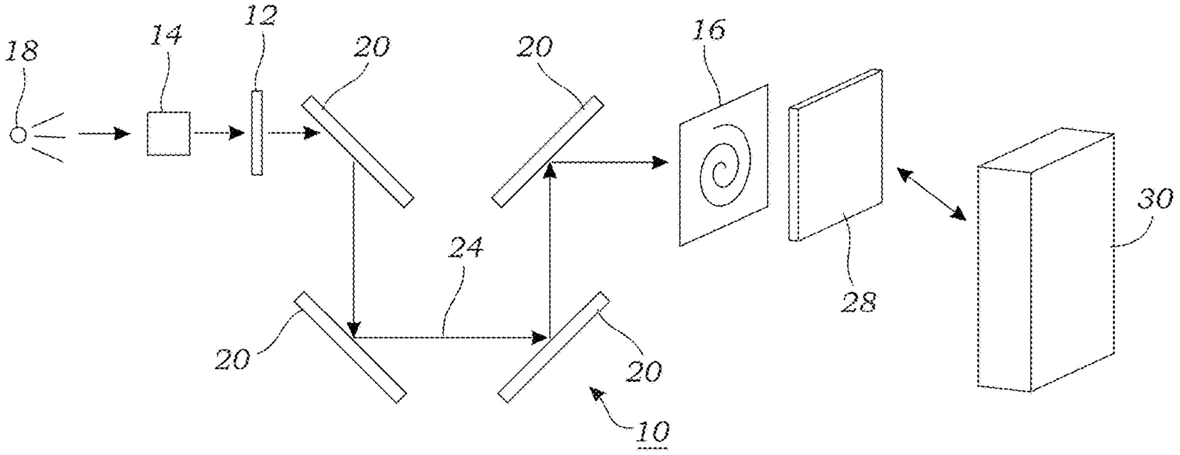
FIG. 3 schematically illustrates an alternative embodiment of a QPI network operating in reflection mode. An input optical field of an object reflects off a plurality of optically reflective layers and generates an intensity image that is captured by an image sensor.
Figure 17:
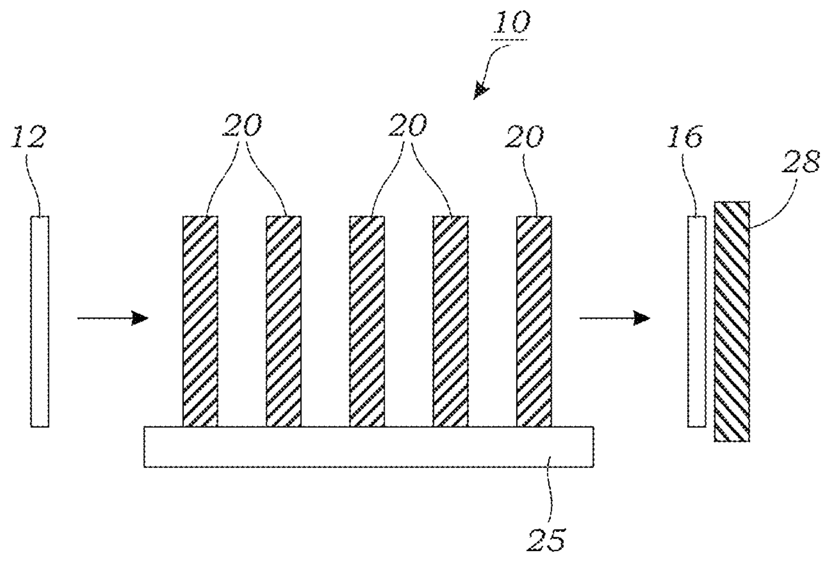
FIG. 17 illustrates an embodiment of the diffractive QPI network with the substrate layers disposed in a holder.

With reference to FIGS. 1 and 2, in one embodiment, the diffractive QPI network 10 contains a plurality of substrate layers 20 that are physical layers which may be formed as a physical substrate or matrix of optically transmissive material (for transmission mode, e.g., FIGS. 1 and 2) or optically reflective material (for reflective mode one) as seen, for example, in FIG. 3. The substrate layers 20 are positioned along an optical path 24 and separated from one another. The substrate layers 20 may be fixed in position relative to one another using a holder 25 such as illustrated in FIG. 17. The holder 25 may include a number of slots or receiving regions formed therein to hold the substrate layers 20. In some embodiments, the spacing between adjacent substrate layers 20 is fixed. In other embodiments, the spacing between adjacent substrate layers 20 is adjustable by manual movement of the substrate layers 20 to different slots of the holder 25 or through adjustment devices (e.g., lead screws, slides, or the like) that can adjust spacing between substrate layers

20. In transmission mode, light or radiation passes through the substrate layers 20 along optical path 24 (as seen in FIGS. 1 and 2). Conversely, in reflective mode as illustrated in FIG. 3, light or radiation reflects off the substrate layer(s) 20. Here, the optical path 24 is folded by the reflective substrate layers 20. In other embodiments, both optically reflective and optically transmissive substrate layers 20 may be used in combination with one another. Exemplary materials that may be used for the substrate layers 20 include polymers and plastics (e.g., those used in additive manufacturing techniques such as 3D printing) as well as semiconductor-based materials (e.g., silicon and oxides thereof, gallium arsenide and oxides thereof), crystalline materials or amorphous materials such as glass and combinations of the same. Metal coated materials may be used for reflective substrate layers 20. As best seen in FIGS. 1-3, the input to the diffractive QPI network 10 is an input optical field 12 that contains optical phase information of an input object 14 (e.g., phase object 14), sample, or input phase data or phase information and the output of the diffractive QPI network 10 is an intensity image 16 that reveals the quantitative phase information of the input optical field 12 that is captured by an image sensor 28. A phase object 14 is an object 14 that causes a phase shift in light passing therethrough or reflecting therefrom. In one embodiment, as phase object 14 is an object 14 where the amplitude transmission coefficient or parameter (or reflection coefficient or parameter) is substantially equal to 1.0 or another constant. The input optical field 12 to the diffractive QPI network 10 may also include data that is encoded as a sample containing a phase distribution or phase information.

The input optical field 12 may include light that is transmitted through or reflected off an object 14 or a sample. One or more illumination sources 18, as seen in FIGS. 2 and 3, may be used to illuminate the object 14. These may include light emitting diodes (LEDs), laser diodes, broadband light sources, and the like. In other embodiments, natural ambient light (e.g., from the sun or other sources) may be used to generate the input optical field 12. The diffractive QPI network 10 may operate at different wavelengths including the visible light spectrum (generally between about 380 nm to about 800 nm) as well as near infrared light (about 800 nm to 2,500 nm), or other wavelengths within the electromagnetic spectrum.

As seen in FIGS. 2 and 3, the QPI network 10 may optionally include a computer 30. The computer 30 receives the intensity images 16 captured by the image sensor 28. The computer 30 may be used to store, process, digitally manipulate, analyze, annotate, display, and/or transfer the intensity images 16. The computer 30 may be located with the QPI network 10 (i.e., a local configuration) or remotely located therefrom (e.g., a server or a mobile computing device such as a Smartphone, tablet PC, laptop or the like). The intensity images 16 may be transferred to the computer 30 via a wired or wireless connection as are known to those skilled in the art. In another embodiment, the image sensor QPI network 10 may be integrated within or associated with a device such as a camera, microscope, or the like. The computer 30 may also be used to communicate with the image sensor 28 and adjust imaging parameters such exposure, saturation, frame acquisition rate, etc.

With reference to FIGS. 8-11, each substrate layer 20 of the diffractive QPI network 10 has a plurality of physical features 22 formed on the surface of the substrate layer 20 or within the substrate layer 20 itself that collectively define a pattern of physical locations along the length and width (or height and width as seen in FIG. 1) of each substrate layer 20 that have varied transmission coefficients/parameters (or varied reflection coefficients/parameters). The physical features 22 formed on or in the substrate layers 20 thus create a pattern of physical locations within the substrate layers 20 that have different valued transmission coefficients/parameters as a function of lateral coordinates (e.g., length and width and in some embodiments depth) across each substrate layer 20. In some embodiments, each separate physical feature 22 may define a discrete physical location on the substrate layer 20 while in other embodiments, multiple physical features 22 may combine or collectively define a physical region with a particular transmission (or reflection) property. The one or more substrate layers 20 arranged along the optical path collectively define a trained mapping function between an input optical field 12 to the one or more optically transmissive and/or reflective substrate layer(s) 20 and an output intensity image 16 or pattern created by optical diffraction through and/or optical reflection from the one or more optically transmissive and/or reflective substrate layer(s) 20 within the diffractive QPI network 10 that reveals the quantitative phase information of the input optical field 12 and creates an intensity image 16 at an output plane that is captured by the image sensor 28.

Figure 8:
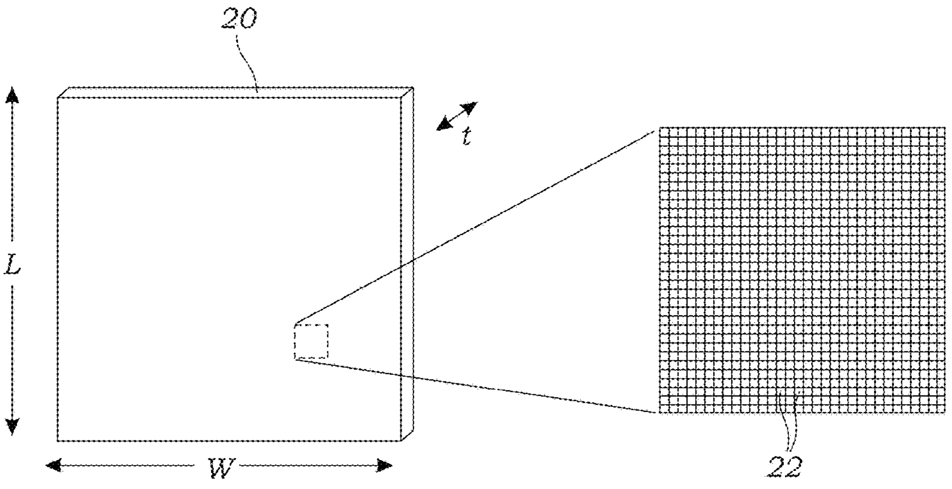
FIG. 8 illustrates a single substrate layer of an optical neural network. The substrate layer may be made from a material that is optically transmissive (for transmission mode) or an optically reflective material (for reflective mode). The substrate layer, which may be formed as a substrate or plate in some embodiments, has surface features formed across the substrate layer. The surface features form a patterned surface (e.g., an array) having different valued transmission (or reflection) parameters as a function of lateral coordinates across each substrate layer. These surface features act as artificial "neurons" that connect to other "neurons" of other substrate layers of the QPI network through optical diffraction which may also include reflection) and alter the phase and/or amplitude of the light wave.

The pattern of physical locations formed by the physical features 22 may define, in some embodiments, an array located across the surface of the substrate layer 20. With reference to FIG. 8, the substrate layer 20 in one embodiment is a two-dimensional generally planar substrate having a length (L), width (W), and thickness (t) that all may vary depending on the particular application. In other embodiments, the substrate layer 20 may be non-planar such as, for example, curved. In addition, while FIG. 8 illustrates a rectangular or square-shaped substrate layer 20 different geometries are contemplated. The physical features 22 and the physical regions formed thereby act as artificial "neurons" that connect to other "neurons" of other substrate layers 20 of the diffractive QPI network 10 through optical diffraction (or reflection) and alter the phase and/or amplitude of the light wave. The particular number and density of the physical features 22 or artificial neurons that are formed in each substrate layer 20 may vary depending on the type of application. In some embodiments, the total number of artificial neurons may only need to be in the hundreds or thousands while in other embodiments, hundreds of thousands or millions of neurons or more may be used. Likewise, the number of substrate layers 20 that are used in a particular diffractive network 10 making up the diffractive QPI network 10 may vary although it typically ranges from at least two substrate layers 20 to less than ten substrate layers 20; although in some embodiments only a single substrate layer 20 can be used.

After a last substrate layer 20 in the optical path, an image sensor 28 is provided that captures the intensity image 16 or pattern. The image sensor 28 may include, for example, a CMOS image sensor or image chip such as CCD, although the image sensor 28 may also include photodetectors (e.g., photodiode such as avalanche photodiode detector (APD)), photomultiplier (PMT) device, and the like. The image sensor 28 may form part of a QPI microscope device or the like that is used to image the phase object(s) 14 or sample.

Figure 9:
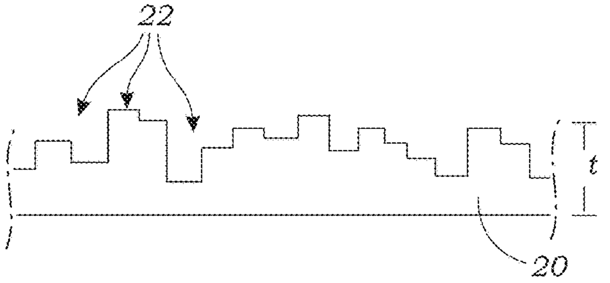
FIG. 9 schematically illustrates a cross-sectional view of a single substrate layer of a QPI network according to one embodiment. In this embodiment, the surface features are formed by adjusting the thickness of the substrate layer that forms the QPI network. These different thicknesses may define peaks and valleys in the substrate layer that act as the artificial "neurons."

FIG. 9 illustrates one embodiment of how different physical features 22 are formed in the substrate layer 20. In this embodiment, a substrate layer 20 has different thicknesses (t) of material at different lateral locations along the substrate layer 20. In one embodiment, the different thicknesses (t) modulates the phase of the light passing through the substrate layer 20. This type of physical feature 22 may be used, for instance, in the transmission mode embodiment of FIG. 1. The different thicknesses of material in the substrate layer 20 forms a plurality of discrete "peaks" and "valleys" that control the transmission coefficient/parameter of the neurons formed in the substrate layer 20. The different thicknesses of the substrate layer 20 may be formed using additive manufacturing techniques (e.g., 3D printing) or lithographic methods utilized in semiconductor processing. For example, the design of the substrate layers 20 may be stored in a stereolithographic file format (e.g., .stl file format) which is then used to 3D print the substrate layers 20. Other manufacturing techniques include well-known wet and dry etching processes that can form very small lithographic features on a substrate layer 20. Lithographic methods may be used to form very small and dense physical features 22 on the substrate layer 20 which may be used with shorter wavelengths of the light. As seen in FIG. 9, in this embodiment, the physical features 22 are fixed in permanent state (i.e., the surface profile is established and remains the same once complete).

Figure 10:
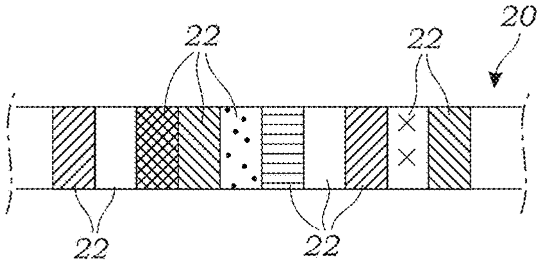
FIG. 10 schematically illustrates a cross-sectional view of a single substrate layer of an QPI network according to another embodiment. In this embodiment, the different surface features are formed by altering the material composition or material properties of the single substrate layer at different lateral locations across the substrate layer. This may be accomplished by doping the substrate layer with a dopant or incorporating other optical materials into the substrate layer. Metamaterials or plasmonic structures may also be incorporated into the substrate layer.

FIG. 10 illustrates another embodiment in which the physical features 22 are created or formed within the substrate layer 20. In this embodiment, the substrate layer 20 may have a substantially uniform thickness but have different regions of the substrate layer 20 have different optical properties. For example, the refractive (or reflective) index of the substrate layers 20 may altered by doping the substrate layers 20 with a dopant (e.g., ions or the like) to form the regions of neurons in the substrate layers 20 with controlled transmission properties (or absorption and/or spectral features). In still other embodiments, optical nonlinearity can be incorporated into the deep optical network design using various optical non-linear materials (e.g., crystals, polymers, semiconductor materials, doped glasses, polymers, organic materials, semiconductors, graphene, quantum dots, carbon nanotubes, and the like) that are incorporated into the substrate layer 20. A masking layer or coating that partially transmits or partially blocks light in different lateral locations on the substrate layer 20 may also be used to form the neurons on the substrate layers 20.

Alternatively, the transmission function of the physical features 22 or neurons can also be engineered by using metamaterial or plasmonic structures. Combinations of all these techniques may also be used. In other embodiments, non-passive components may be incorporated in into the substrate layers 20 such as spatial light modulators (SLMs). SLMs are devices that imposes spatial varying modulation of the phase, amplitude, or polarization of a light. SLMs may include optically addressed SLMs and electrically addressed SLM. Electric SLMs include liquid crystal-based technologies that are switched by using thin-film transistors (for transmission applications) or silicon backplanes (for reflective applications). Another example of an electric SLM includes magneto-optic devices that use pixelated crystals of aluminum garnet switched by an array of magnetic coils using the magneto-optical effect. Additional electronic SLMs include devices that use nanofabricated deformable or moveable mirrors that are electrostatically controlled to selectively deflect light.

Figure 11:
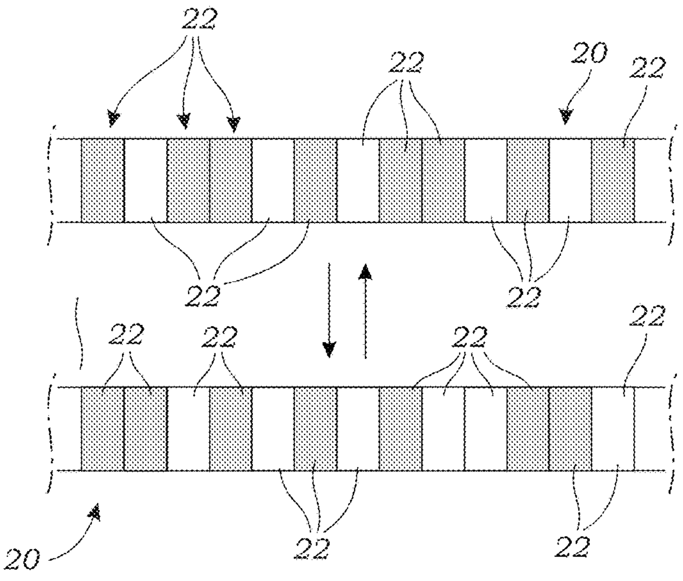
FIG. 11 schematically illustrates a cross-sectional view of a single substrate layer of a QPI network according to another embodiment. In this embodiment, the substrate layer is reconfigurable in that the optical properties of the various artificial neurons may be changed, for example, by application of a stimulus (e.g., electrical current or field). An example includes spatial light modulators (SLMs) which can change their optical properties. In this embodiment, the neuronal structure is not fixed and can be dynamically changed or tuned as appropriate. This embodiment, for example, can provide a learning diffractive network or a changeable diffractive network that can be altered on-the-fly (e.g., over time) to improve the performance, compensate for aberrations, movements, etc.

FIG. 11 schematically illustrates a cross-sectional view of a single substrate layer 20 of a diffractive network 10 according to another embodiment. In this embodiment, the substrate layer 20 is reconfigurable in that the optical properties of the various physical features 22 that form the artificial neurons may be changed, for example, by application of a stimulus (e.g., electrical current or field). An example includes spatial light modulators (SLMs) discussed above which can change their optical properties. In other embodiments, the layers may use the DC electro-optic effect to introduce optical nonlinearity into the substrate layers 20 of diffractive QPI network 10 and require a DC electric-field for each substrate layer 20 of the diffractive QPI network 10. This electric-field (or electric current) can be externally applied to each substrate layer 20 of the optical neural network 10. Alternatively, one can also use poled materials with very strong built-in electric fields as part of the material (e.g., poled crystals or glasses). In this embodiment, the neuronal structure is not fixed and can be dynamically changed or tuned as appropriate (i.e., changed on demand). This embodiment, for example, can provide a learning diffractive QPI network 10 or a changeable diffractive QPI network 10 that can be altered on-the-fly to improve the performance, compensate for aberrations, or even change another task.

Figure 18:
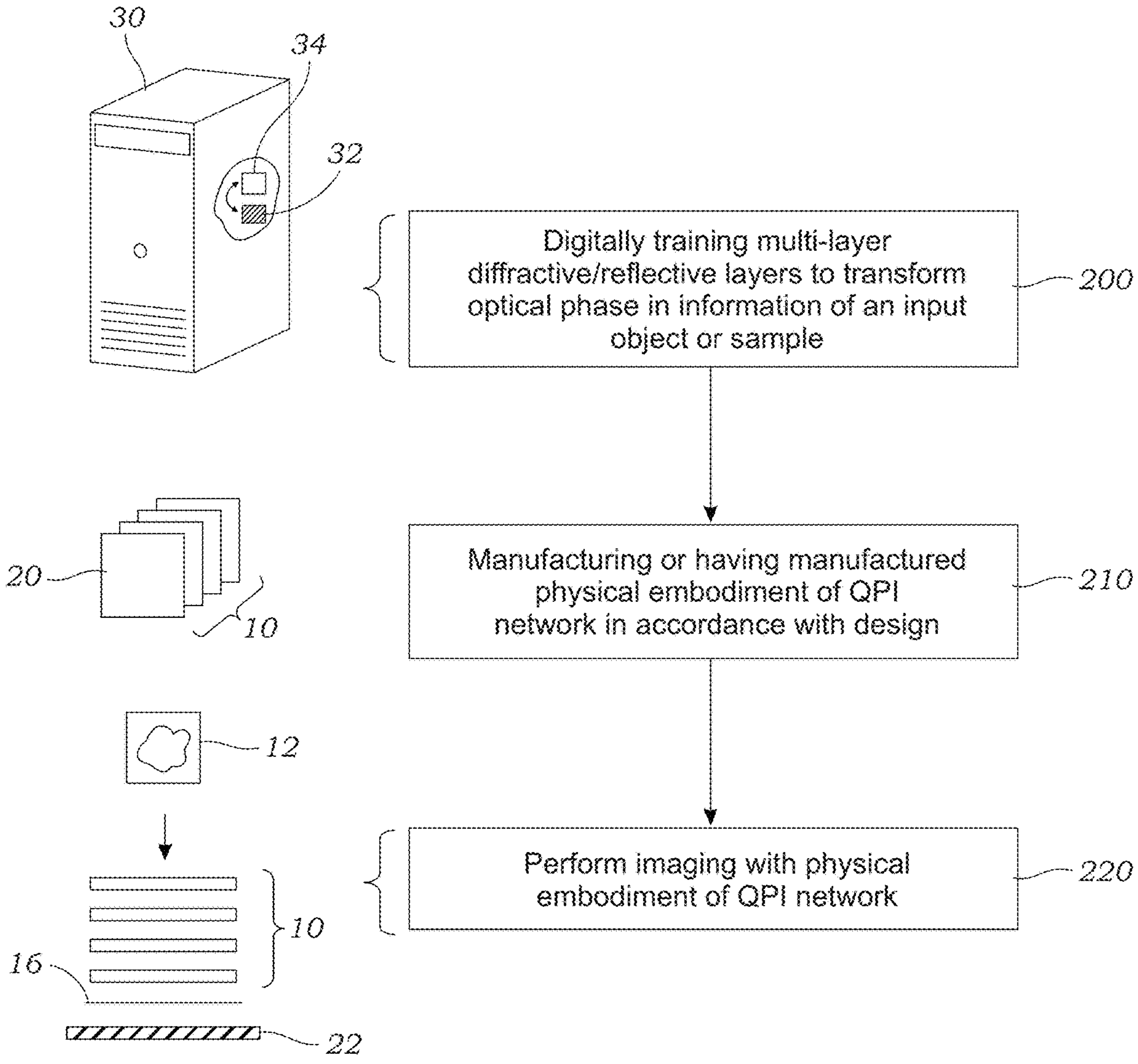
FIG. 18 illustrates a flowchart of operations used to design and use a diffractive QPI network according to one embodiment.

With reference to FIG. 18, a computerized model of the diffractive QPI network 10 is first digitally trained. This is illustrated in operation 200 of FIG. 18. A computing device 30 having one or more processors 32 and software 34 is provided that generates the computerized or numerical model for the layers 20 of the QPI network 10. Here, the model of the diffractive QPI network 10 is trained to all-optically transform or convert optical phase information of an input object 14 into an intensity image 16, revealing QPI information in radians without the use of a computer (after training) or digital image reconstruction. Software 34 executed by the computing device 30 digitally trains a model or mathematical representation of the multi-layer diffractive and/or reflective substrate layers 20 used within the diffractive QPI network 10 to perform the optical phase to intensity image transformation. This training establishes the particular transmission/reflection properties of the physical features 22 and/or neurons formed in the substrate layers 20 to reveal the quantitative phase information of the input optical field 12 (e.g., from the phase object 14).

Next, using the established model and design for the physical embodiment of the diffractive QPI network 10, the actual substrate layers 20 used in the physical embodiment of the diffractive QPI network 10 are then manufactured in accordance with the model or design. The design, in some embodiments, may be embodied in a software format (e.g., SOLIDWORKS®, AUTOCAD®, INVENTOR®, or other computer-aided design (CAD) program or lithographic software program) and may then be manufactured into a physical embodiment that includes the plurality of substrate layers 20 having the tailored physical features 22 formed therein/thereon. The physical substrate layers 20, once manufactured may be mounted or disposed in a holder 25 or the like to maintain the appropriate spacing between the substrate layers 20. The holder 25 may include a number of slots formed therein to hold the individual substrate layers 20 in the required sequence and with the required spacing between adjacent layers (if needed). The physical substrate layers 20 may also be integrated into a monolithic structure in other embodiments. The substrate layers 20 may also be incorporated into a waveguide like an optical fiber.

Experimental

Revealing the optical phase delay induced by an input object by converting or encoding the sample information into an optical intensity image or pattern at the output plane is a relatively old and well-known technique. Unlike analog phase contrast imaging methods that allow qualitative investigation of the samples, modern QPI systems numerically retrieve the spatial map of the optical phase delay induced by the sample. However, the fundamental idea of encoding the phase information of the object function into the output intensity pattern prevails. For instance, coherent QPI methods use optical hardware, commonly based on conventional optical components such as lenses and beamsplitters, to generate interference between a reference wave and the object wave over an image sensor-array, creating fringe patterns that implicitly describe the phase function of the input sample. These QPI systems also rely on a phase recovery step implemented in a computer that decodes the object phase information by digitally processing the recorded optical intensity pattern(s), often using iterative algorithms.

To create an all-optical QPI solution without any digital phase reconstruction algorithm, diffractive networks 10 were designed that transform the phase information of the input sample or objects 14 therein into an output intensity image or pattern 16, quantitatively revealing the object phase distribution through an intensity recording. FIG. 1 illustrates the schematic of a 5-layer diffractive network 10 that was trained to all-optically synthesize the QPI intensity image or pattern 16 of a given input phase object 14 (see Methods section for training details). This QPI network 10 can precisely quantify and map the optical path length variations at the input, and unlike the modern QPI systems, it does not rely on a computationally intensive phase reconstruction algorithm or a digital computer.

For a proof-of-concept demonstration, the design of diffractive QPI networks 10 with unit magnification was considered, such that the input object 14 features in the phase space have the same scale as the output intensity features behind the diffractive network 10. Since the value of the output optical intensity in the intensity image or pattern 16 will depend on external physical factors such as, e.g., the power of the illumination source 18 and the quantum efficiency of the image sensor-array 28, a background region was used (see Methods section) that surrounds the unit magnification output image 16 to obtain a reference mean intensity. This mean signal intensity value at this background region is used to normalize the output intensity of the diffractive network's image 16 to reveal the quantitative phase information of the sample in radians, i.e., $I_{QPI}(x,y)$ [rad]. Therefore, at the output plane of the diffractive QPI network 10, an output signal area was defined that is slightly larger than the input sample field-of-view, where the edges are used to reveal the intensity normalization factor, which makes the diffractive QPI designs invariant to changes in the illumination beam intensity or the diffraction efficiency of the imaging system, correctly revealing $I_{QPI}(x,y)$, matching the quantitative phase information of the input object 14 in radians.

Figure 4A:
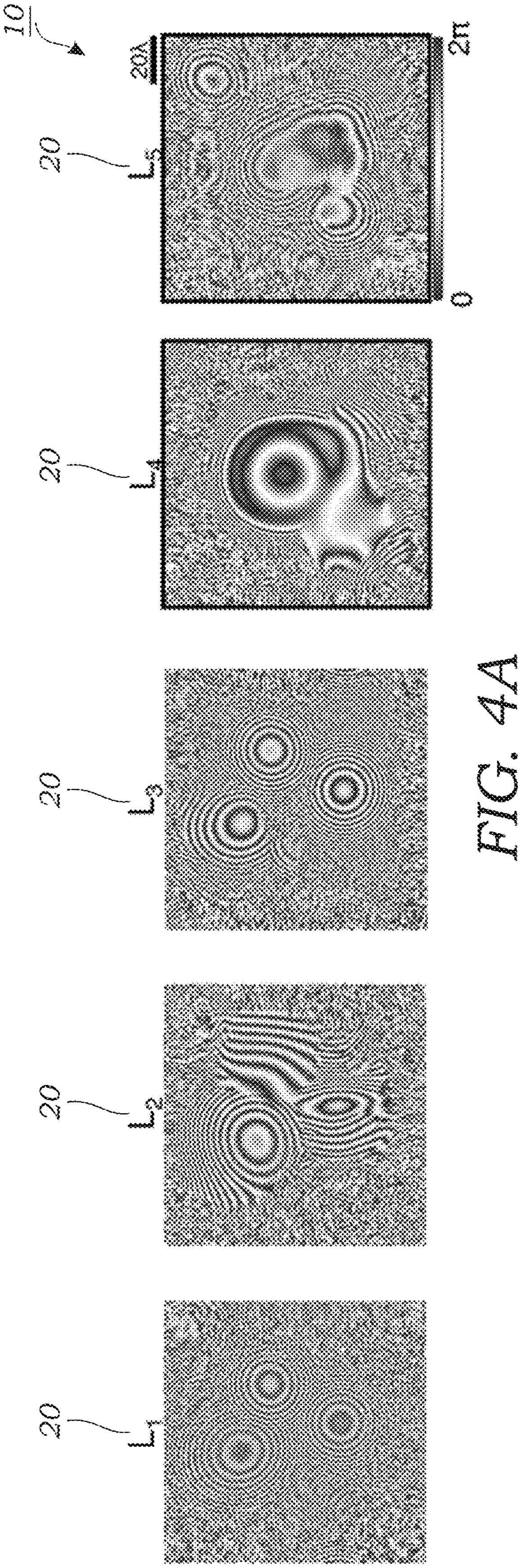
FIGS. 4A-4D show the generalization capability of diffractive QPI networks.
Figure 4B:
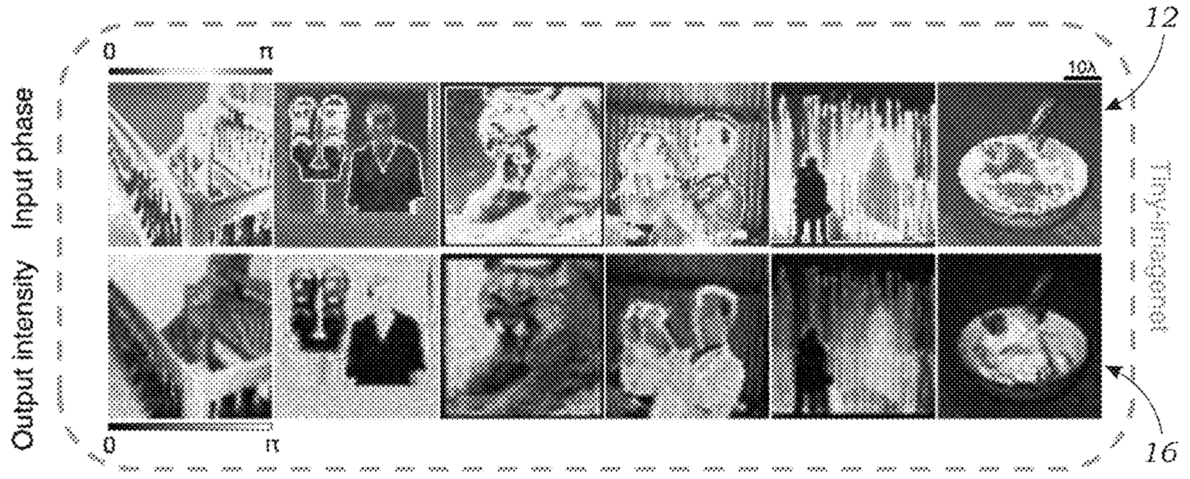

FIG. 4A shows the phase-only diffractive layers constituting a diffractive QPI network 10 that is trained using deep learning. In the proof-of-concept numerical experiments, the diffractive network designs were trained and tested on well-known image datasets to better benchmark the resulting QPI capabilities. Given a normalized greyscale image from a target dataset, $\phi(x,y)$, the corresponding function of a phase object 14 at the input plane can be written as $e^{j\alpha\pi\phi(x,y)}$ where $|\phi(x,y)|\leq 1$. The parameter $\alpha$ determines the range of the phase shift induced by the input object 14. The diffractive optical network 10 shown in FIG. 4A was trained based on $\phi(x,y)$ taken from the Tiny-Imagenet dataset and the parameter, $\alpha$, was set to be 1 for both training and testing, i.e., $\alpha_{tr}=\alpha_{test}=1$. FIG. 4B illustrates the QPI signals or intensity image/pattern 16, $I_{QPI}(x,y)$, for exemplary test samples from the Tiny-imagenet dataset, never seen by the diffractive network 10 in the training phase, along with the corresponding ground truth images, $\phi(x,y)$. The success of the QPI signal synthesis performed by the presented diffractive network 10 was quantified using the Structural Similarity Index Measure (SSIM) and the peak signal-to-noise ratio (PSNR). The diffractive network shown in FIG. 4A provides an SSIM of 0.824±0.050 (mean±std) and a PSNR of 26.43 dB±2.69 over the entire 10K test samples of the Tiny-Imagenet.

Figure 4C:
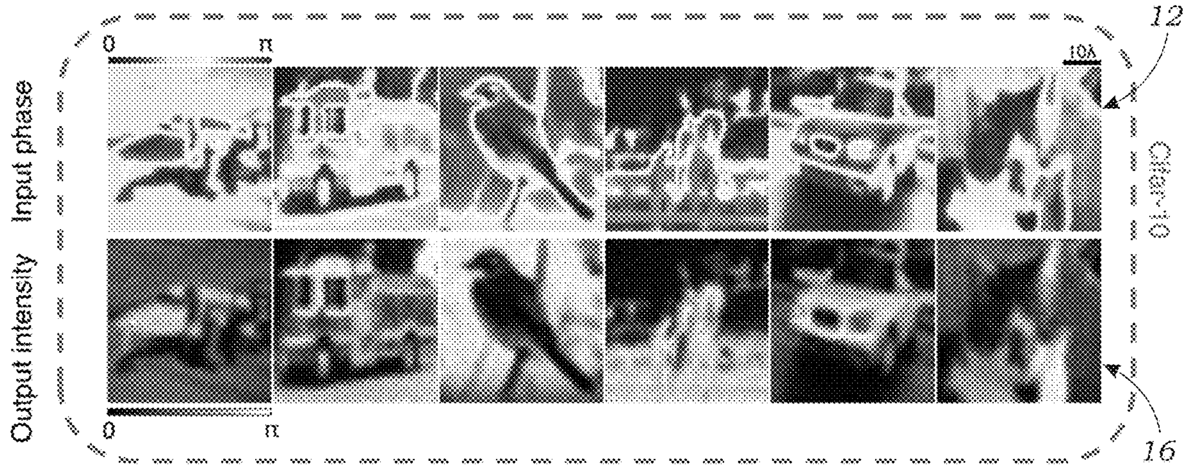
Figure 4D:
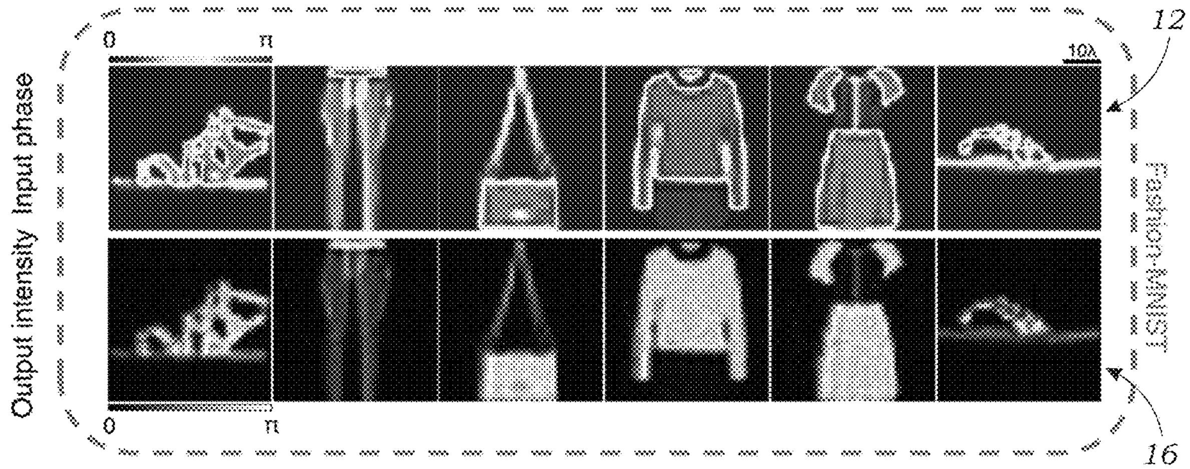

Although the diffractive QPI network design can successfully transform the phase information of the samples into quantitative optical intensity information, providing a competitive QPI performance without the need for any digital phase recovery algorithm, one might argue that the underlying phase-to-intensity transformation performed by the diffractive network 10 is data-specific. To shed more light on this, the generalization capabilities of the diffractive network design was investigated by further testing its QPI performance over phase-encoded samples from two completely different image datasets, i.e., CIFAR-10 and Fashion-MNIST, that were not used in the training phase. As shown in FIGS. 4C-4D, the SSIM and PSNR values achieved by the presented diffractive QPI network 10 for quantitative phase imaging of CIFAR-10 (and Fashion-MNIST) images are 0.917±0.041 (and 0.596±0.116) and 31.98 dB±3.15 (and 26.94 dB±1.5), respectively. Interestingly, the QPI signal or intensity image/pattern 16 synthesis quality turned out to be higher for CIFAR-10 images compared to the performance of the same diffractive network 10 on the Tiny-Imagenet test samples, even though CIFAR-10 has an entirely different set of objects and spatial features (which were never used during the training phase). This could be partially attributed to the difference in the original size of the Tiny-Imagenet (64×64-pixel) and CIFAR-10 (32×32-pixel) images. Considering that the physical dimensions of the input field-of-view in the network configuration is 42.4λ×42.4λ, the size of the smallest spatial feature becomes $$\frac{42.4\lambda}{64} = 0.6625\lambda \text{ and } 2\times 0.6625\lambda$$

for Tiny-Imagenet and CIFAR-10 datasets, respectively; this makes CIFAR-10 test samples relatively easier to image through the diffractive QPI network 10.

Figure 5A:
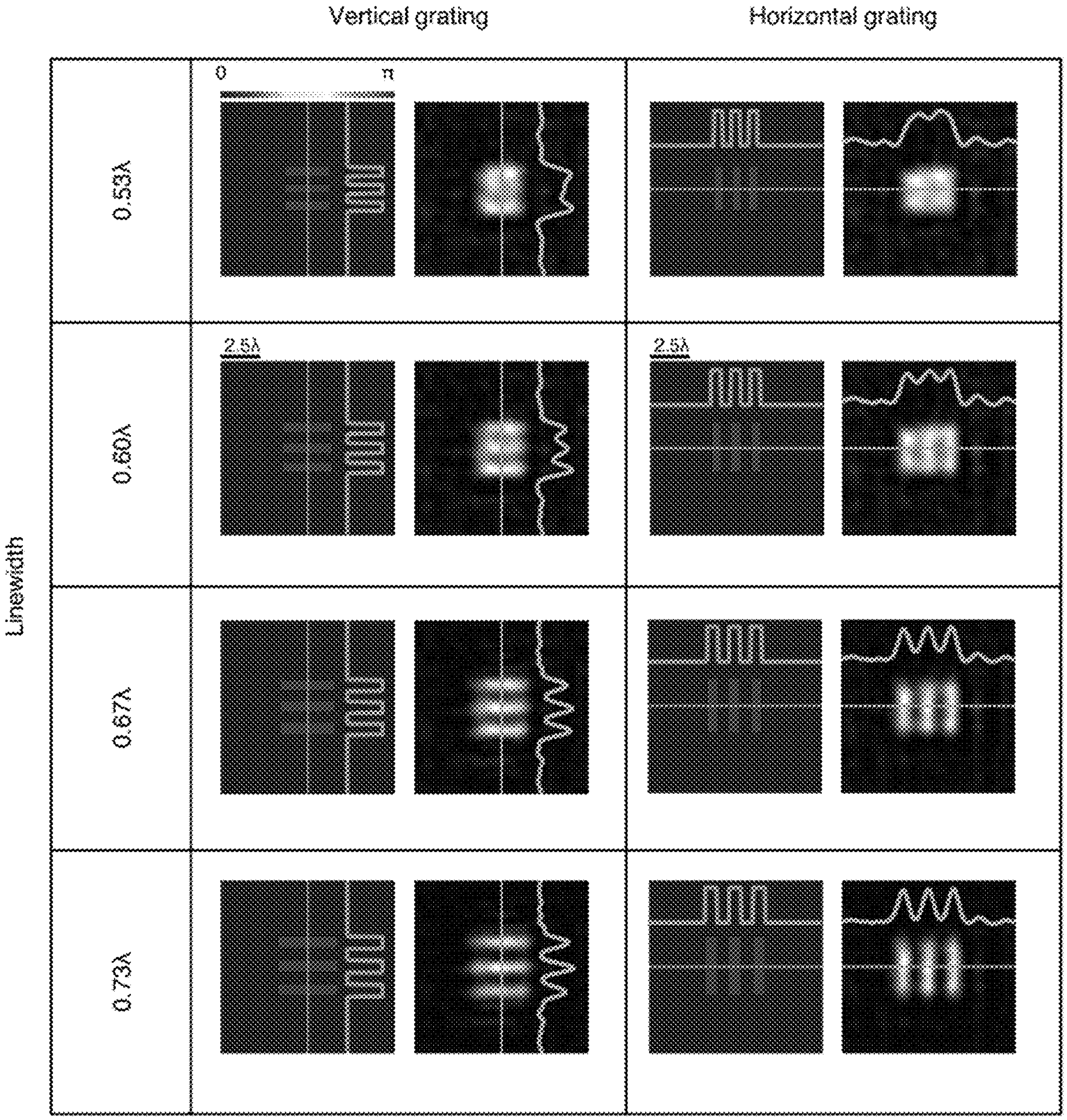
FIGS. 5A and 5B illustrates the spatial resolution and phase sensitivity analysis for the diffractive QPI network shown in FIG. 4A.
Figure 5B:
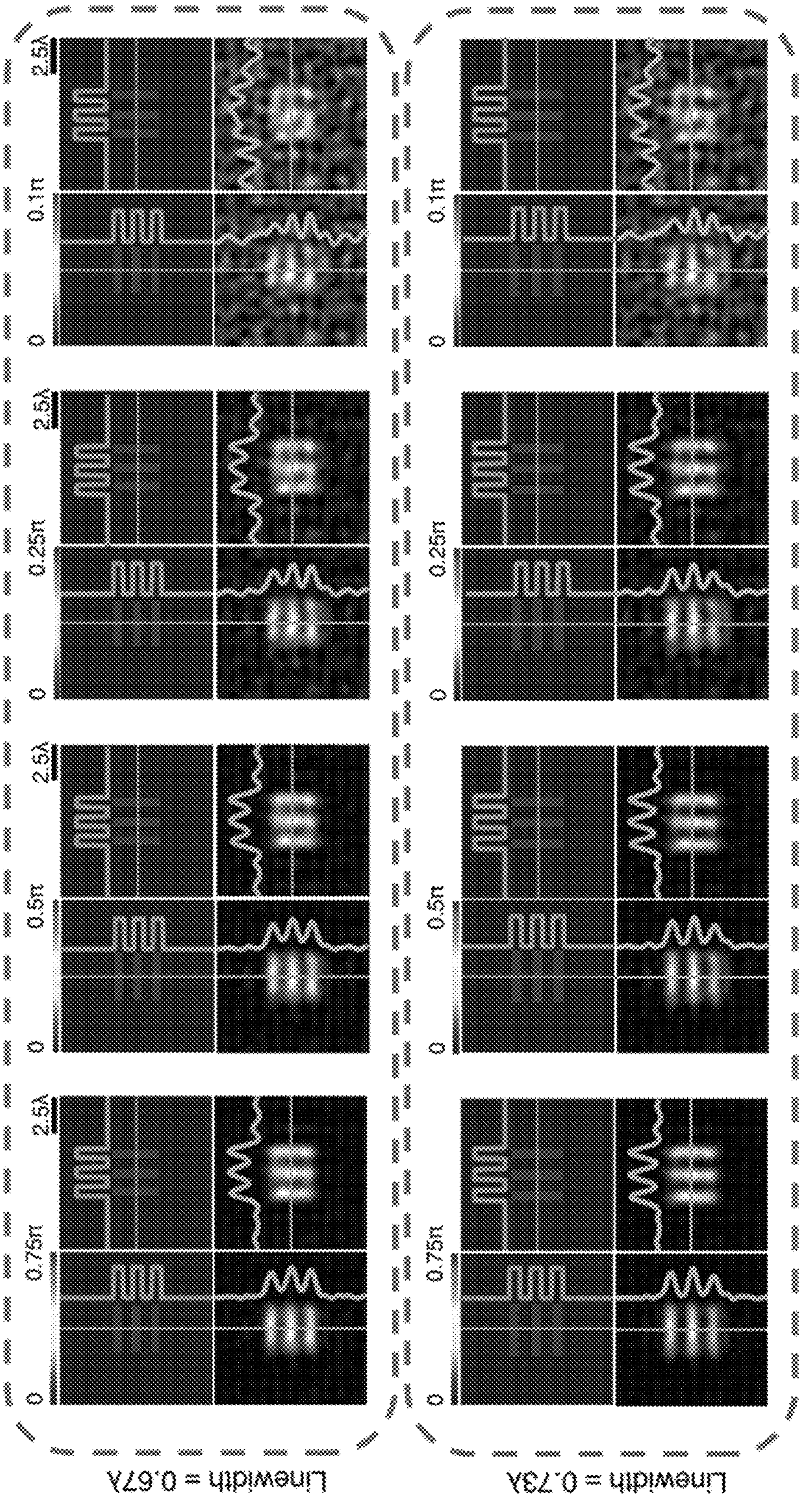

Next, the smallest resolvable linewidth was numerically quantified and the related phase sensitivity of the diffractive QPI network design using binary phase gratings as test objects 14 (see FIGS. 5A-5B). Such resolution test targets were not used as part of the training, which only included the Tiny-Imagenet dataset. The presented QPI network 10 performs QPI with diffractive layers 20 of size 106λ×106λ that are placed 40λ apart from each other and the input/output fields-of-view (see FIG. 1). This physical configuration reveals that the numerical aperture (NA) of the QPI diffractive network 10 is $$\sin\left(\tan^{-1}\left(\frac{106\lambda}{2\times 40\lambda}\right)\right) = \sim 0.8,$$

which corresponds to a diffraction-limited resolvable linewidth of 0.625λ. The numerical analysis in FIG. 5A showed that the smallest resolvable linewidth with the diffractive QPI design was ~0.67λ, when the input gratings were 0-π encoded, closely matching the resolvable feature size determined by the NA of the system; also note that the effective feature size of the training samples from Tiny-Imagenet is 0.6625λ. This analysis means that the training phase was successful in approximating a general-purpose quantitative phase imager despite using relatively lower resolution training images, coming close to the theoretical diffraction limit imposed by the physical structure of the diffractive QPI network 10.

The input phase contrast is another crucial factor affecting the resolution of QPI achieved by the QPI diffractive network 10 design. To shed additional details on this, the diffractive QPI network 10 was numerically tested on binary gratings with two different linewidths, 0.67λ and 0.75λ, at varying levels of input phase contrast, as shown in FIG. 5B. Based on the resulting diffractive QPI signals illustrated in FIGS. 5A-5B, the 0.67λ linewidth grating remains resolvable until the input phase contrast falls below 0.25π. The last column of FIG. 5B suggests that when the contrast parameter ($\alpha_{test}$) is taken to be 0.1, the noise level in the QPI signal or intensity image/pattern 16 generated by the QPI diffractive network 10 increases to a level where the 0.67λ linewidth grating cannot be resolved anymore. On the other hand, 0.75λ linewidth grating remains to be partially resolvable despite the noisy background, even at 0-0.1π phase contrast (i.e., $\alpha_{test}$=0.1).

Figure 6A:
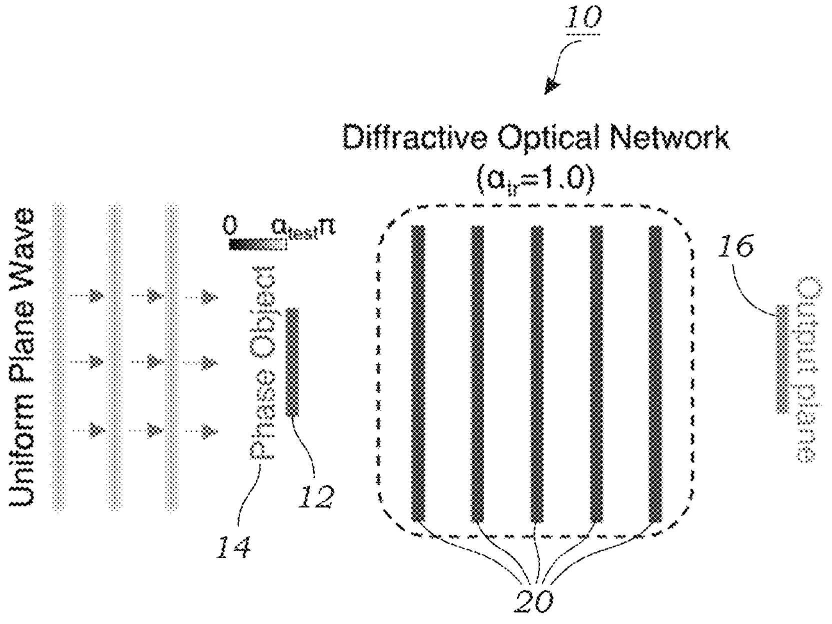
FIGS. 6A-6C show the impact of input phase range on the diffractive QPI signal quality.
Figure 6B:
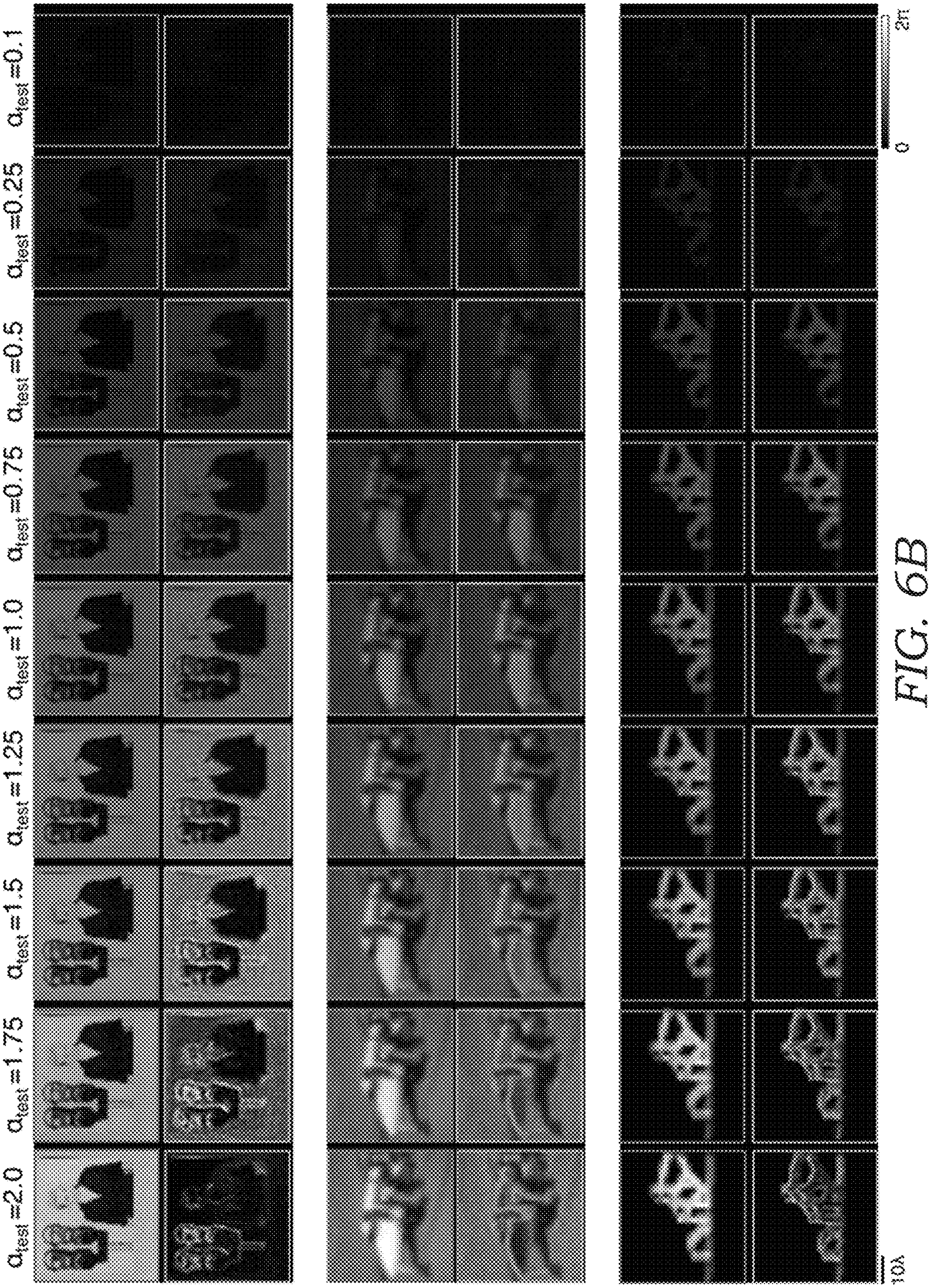
Figure 6C:
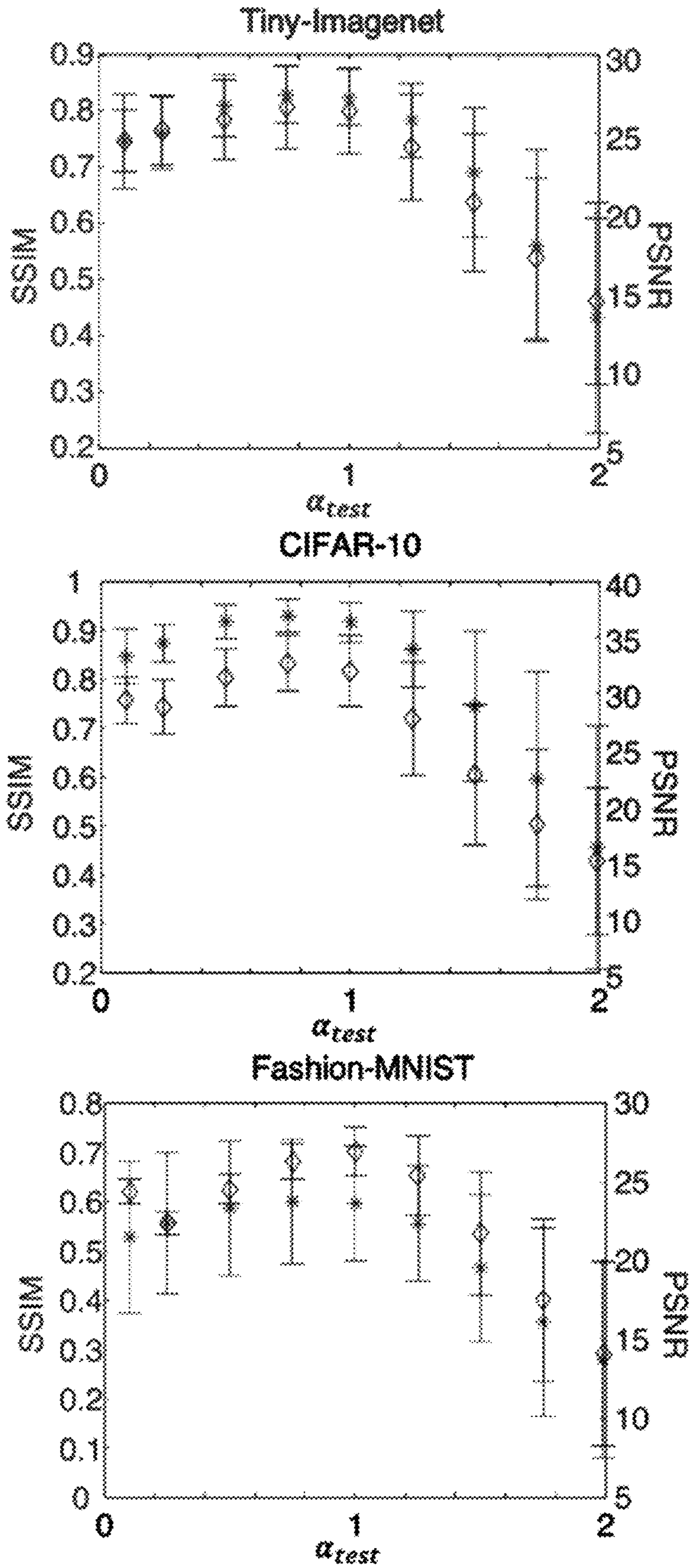

A similar analysis was conducted on the effect of the input phase contrast over the quality of QPI performed by the presented diffractive QPI network 10. By setting the phase contrast parameter $\alpha_{test}$ to nine (9) different values between 0.1 and 2.0 for all three image datasets (Tiny-Imagenet, CIFAR-10 and Fashion-MNIST), the resulting SSIM and PSNR values were quantified for the reconstructed images at the output plane of the diffractive QPI network 10. FIGS. 6A-6C illustrate the QPI network 10, output intensity images 16 and mean and standard deviations of the SSIM and PSNR metrics (FIG. 6C) as a function of $\alpha_{test}$ for all three image datasets. A close examination of FIGS. 6A-6C reveals that both SSIM and PSNR peaks at $\alpha_{test}$=1, which matches the phase encoding range used during the training phase, i.e., $\alpha_{tr}=\alpha_{test}$=1. To the left of these peaks, where $\alpha_{test}<\alpha_{tr}$=1, there is a slight degradation in the performance of the presented diffractive QPI network 10, mainly due to the increasing demand in phase sensitivity at the resulting image 16, $I_{QPI}(x,y)$. With $\alpha_{tr}$=1 and 8-bit quantization of input signals, the phase step size that the diffractive QPI network 10 was trained with was $$\frac{\pi}{256} = 0.0123$$

radians; however, which $\alpha_{test}$ deviates from the training, for instance $\alpha_{test}$=0.5, then the smallest phase step size that the diffractive QPI network 10 is tasked to sense becomes $$\frac{0.5\pi}{256} = 0.0062$$

radians. In other words, the diffractive QPI network 10 must be 2× more phase sensitive compared to the level it was trained for, causing some degradation in the SSIM and PSNR values as shown in FIGS. 6A-6C for $\alpha_{test}<\alpha_{tr}$=1.

Figure 12A:
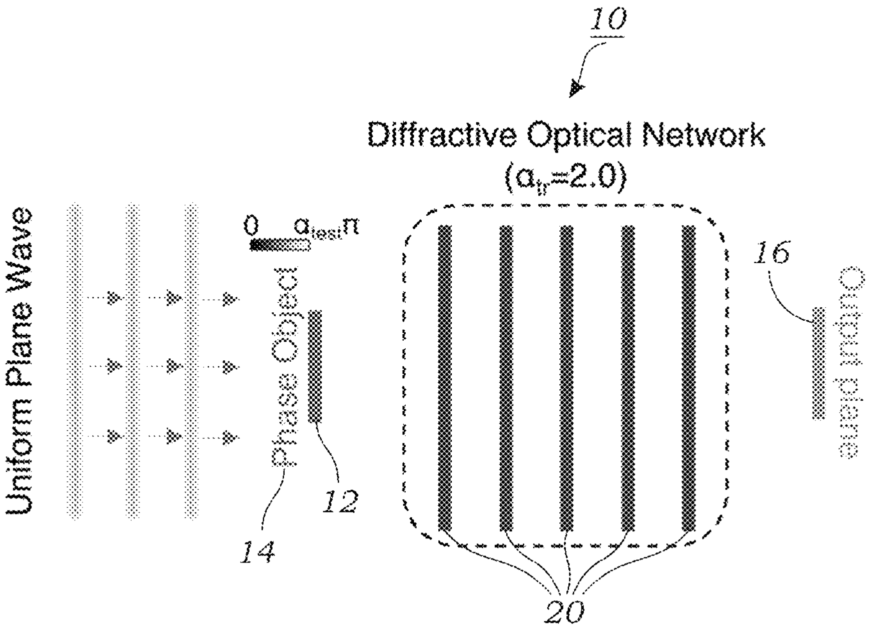
FIGS. 12A-12C illustrate the impact of input phase range on the diffractive QPI signal quality. Same as FIGS. 6A-6C except that this diffractive QPI network was trained with $\alpha_{tr}$=2.0, meaning that the training images had [0, 2$\pi$] phase range, instead of [0, $\pi$].
Figure 12B:
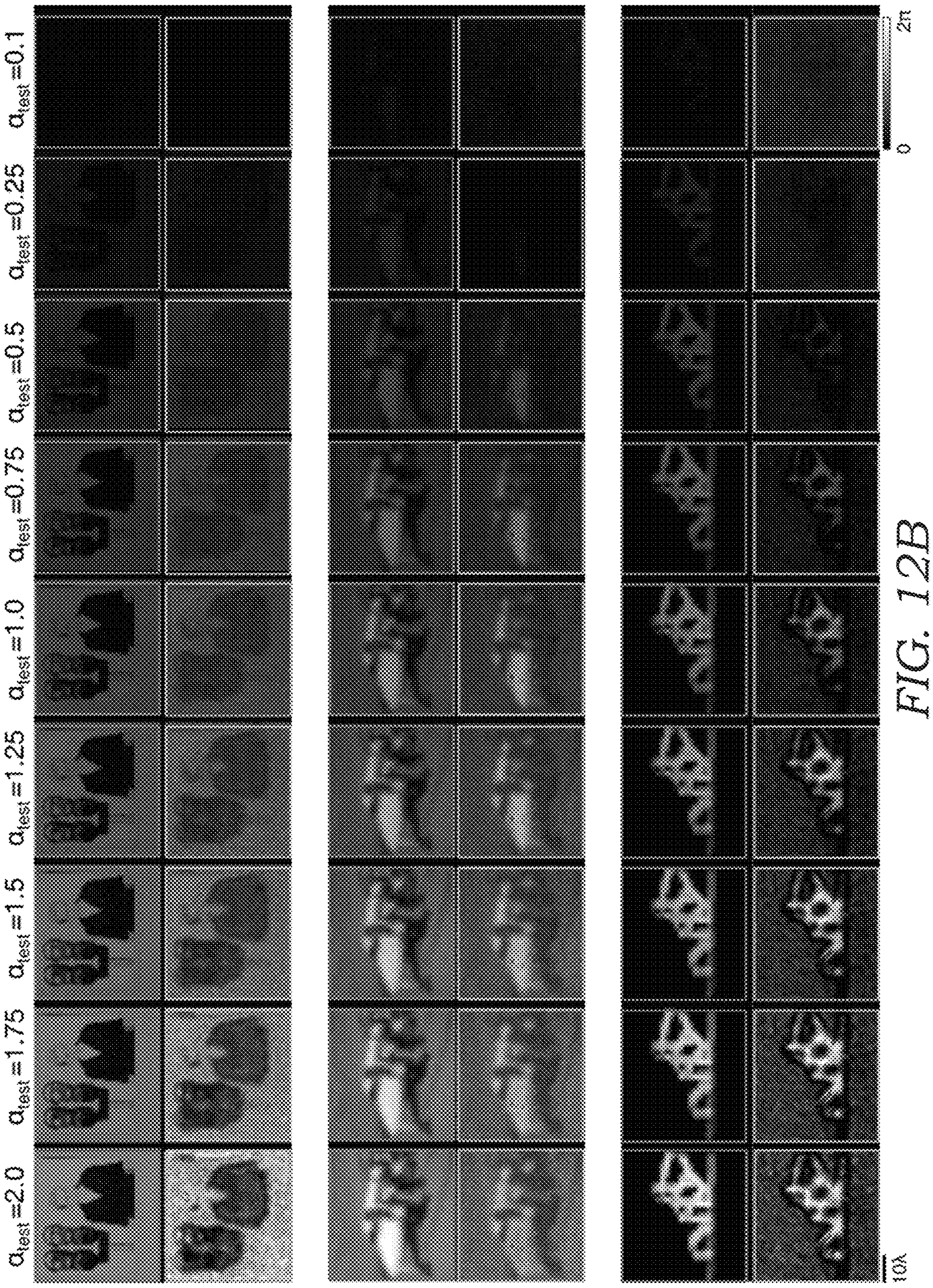
Figure 12C:
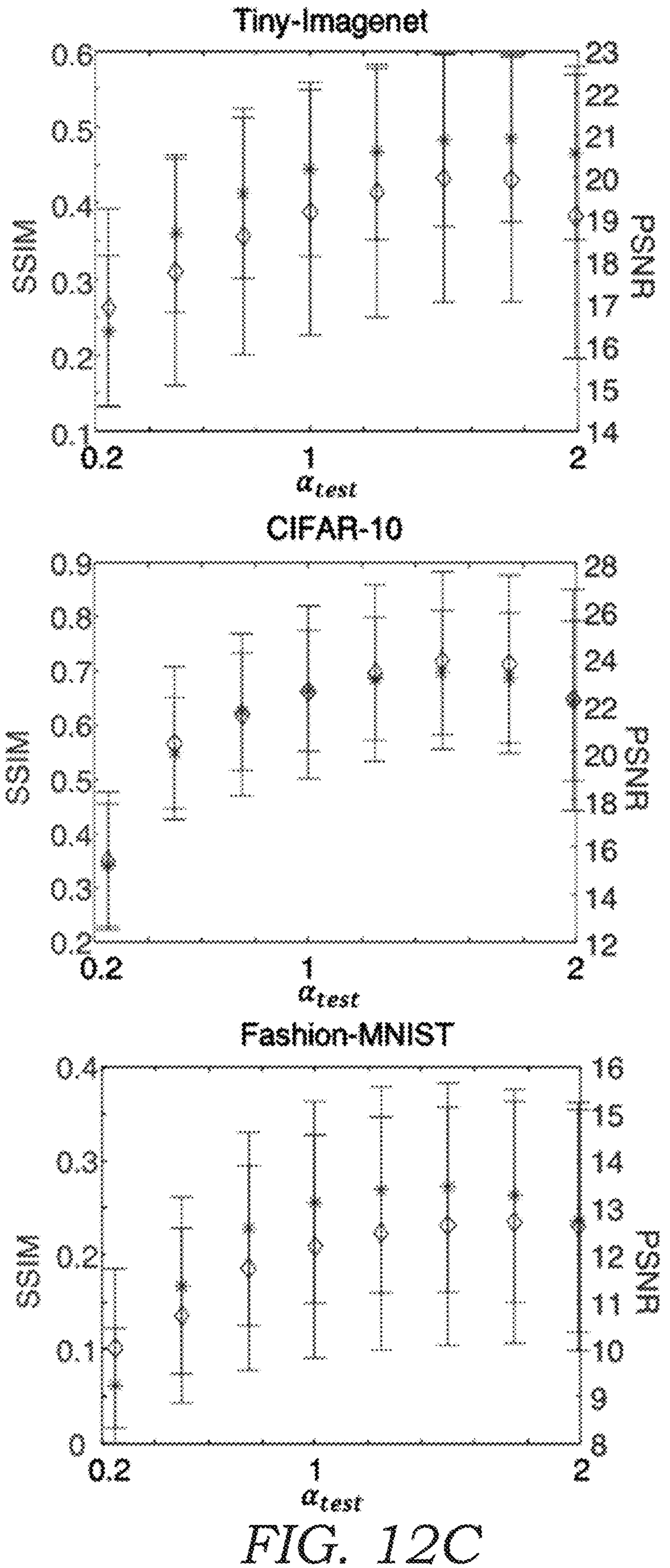
Figure 13A:
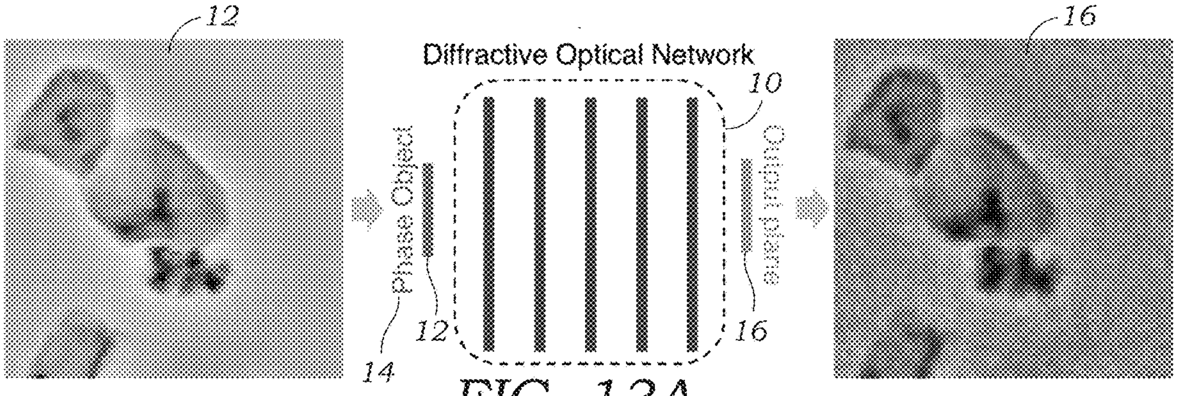
FIGS. 13A-13D illustrate the performance of a QPI diffractive optical network on Pap-smear samples. The input images represent the phase channel of Pap-smear samples (monolayer of cells), and the QPI signals (output intensity) are synthesized by the diffractive optical network shown in FIG. 4A. Although, this QPI diffractive network model is trained using only the images from Tiny-imagenet, it can blindly achieve SSIM and PSNR values of 0.663±0.047 and 25.55 dB±1.44, respectively, over these Pap-smear samples.
Figure 13B:
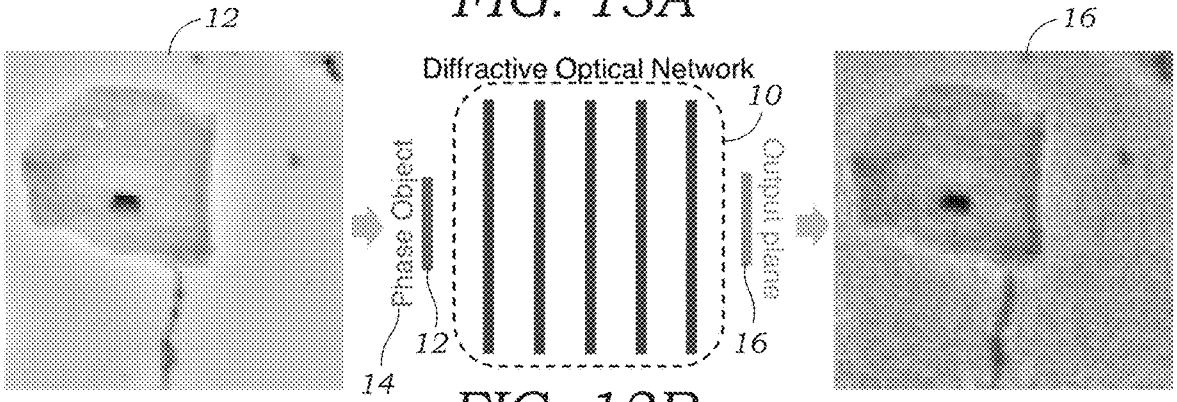
Figure 13C:
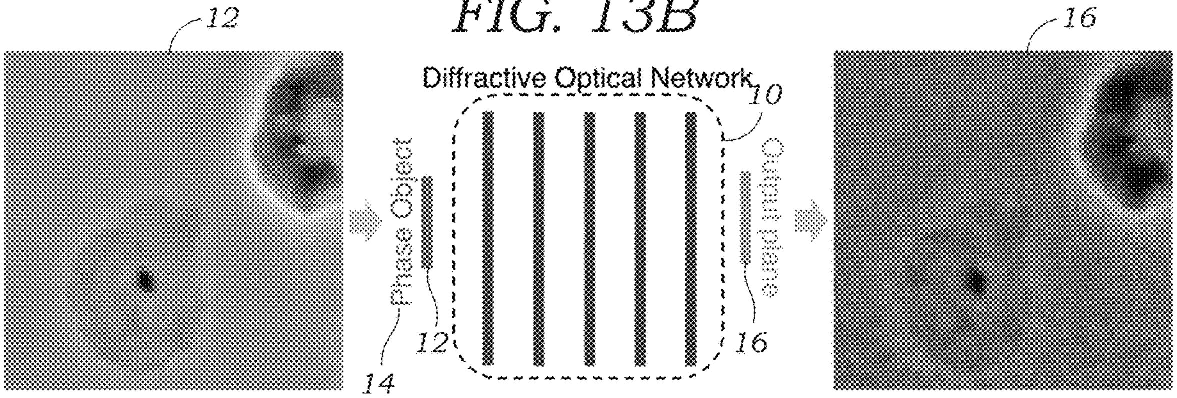
Figure 13D:
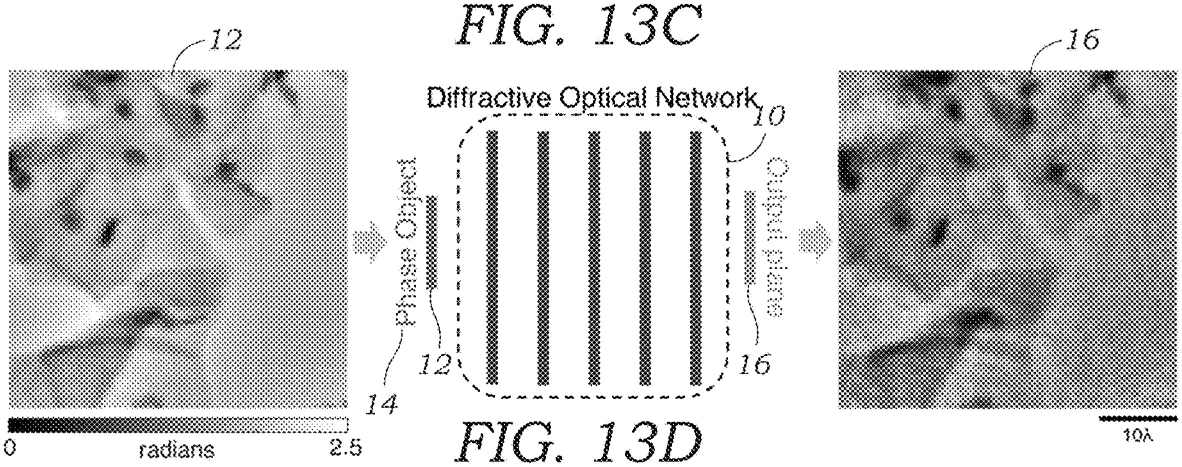

On the other hand, when the input phase encoding exceeds the [0, π] range used during the training phase, the degradation in diffractive QPI signal or output intensity image 16 quality is more severe. As $\alpha_{test}$ approaches to 2.0, the errors and artifacts created by the presented diffractive QPI network 10 in computing the QPI signal or intensity image 16 increase. Interestingly, at $\alpha_{test}$=1.99, the forward optical transformation of the diffractive QPI network 10 starts to act as an edge detector. A straightforward solution to mitigate this performance degradation is to train the diffractive QPI network 10 with $\alpha_{tr}=2.0-\epsilon$, where ϵ is a small number, meaning that during the training phase, the dynamic range of the phase values at the input plane will be within [0, 2π]. FIGS. 12A-12B illustrates an example of this for a 5-layer diffractive QPI network 10 that was trained with $\alpha_{tr}$=1.99. This new diffractive network 10 has the same physical layout and architecture as the previous one shown in FIG. 4A. The only difference between the two diffractive QPI networks 10 is the phase range covered by the input samples used during their training ($\alpha_{tr}$=1.0 vs. $\alpha_{tr}$=1.99). Since the design evolution of this new diffractive QPI network 10 is driven by input samples covering the entire [0, 2π] phase range, in the case of $\alpha_{test}=\alpha_{tr}$=1.99, it provides a much better QPI performance compared to the diffractive network 10 shown in FIG. 4A. This improved diffractive QPI performance can also be visually observed by comparing the images shown in FIG. 6B and FIGS. 12A-12B under the $\alpha_{test}$=2.0 column.

Compared to earlier works on diffractive optical networks that demonstrated amplitude imaging, the presented QPI diffractive networks 10 report significant advances. While a conventional amplitude imaging task requires the diffractive network to achieve a point-to-point intensity mapping between the input and output fields-of-view, phase-to-intensity transformation converts the input phase information of an object 14 into quantitative output intensity variations, and this function (quantitative phase-to-intensity transformation) is all-optically approximated through a QPI diffractive network 10. Furthermore, a vital feature of the presented diffractive QPI networks 10 is that their operation is invariant to changes in the input beam intensity or the power efficiency of the diffractive detection system; by using the mean intensity value surrounding the output image 16 field-of-view as a normalization factor, the resulting diffractive image intensity of the output image 16 $I_{QPI}(x,y)$ reports the phase distribution of the input object 14 in radians. Moreover, the presented diffractive QPI networks 10 are composed of passive layers 20, and therefore perform QPI without any external power source other than the illumination light. It is true that the training stage of a diffractive QPI network 10 takes a significant amount of time (e.g., ~40 hours) and consumes some energy for training-related computing. But this is a one-time training effort, and in the image inference stage, there is no power consumption per object 14 (except for the illumination if external), and the reconstructed image 16 reveals the quantitative phase information of the object 14 at the speed of light propagation through a passive network, without the need for a graphics processing unit (GPU) or a computer. One should think of a diffractive network's design, training and fabrication phase (a one-time effort) similar to the design/fabrication/assembly phase of a digital processor or a GPU that are used in computers.

Another important aspect of the presented diffractive framework for QPI networks 10 is its generalization capability over image datasets other than the one used in the training phase, as shown in FIGS. 4A-4C. To further test the role of the training dataset in the generalization capability of the diffractive QPI network 10, a new diffractive QPI network 10 was trained with a physical architecture identical to that of the QPI diffractive network 10 shown in FIG. 4A. The only difference was that this new diffractive optical network 10 was trained using the Fashion-MNIST dataset instead of the Tiny-Imagenet. Compared to the QPI diffractive network 10 shown in FIG. 4A (trained with Tiny-Imagenet) that achieved (SSIM, PSNR) performance metrics of (0.824±0.050, 26.43 dB±2.69), (0.917±0.041, 31.98 dB±3.15) and (0.596±0.116, 26.94 dB±1.5) for Tiny-Imagenet, CIFAR-10 and Fashion-MNIST test datasets, respectively, this new QPI diffractive network 10 (trained with Fashion-MNIST) provided (SSIM, PSNR) performance metrics of (0.622±0.085, 19.97 dB±2.36), (0.699±0.106, 21.38 dB±2.7) and (0.816±0.060, 31.26 dB±2.12), for the same test datasets, respectively. From this comparison, one can conclude that: (1) the QPI diffractive network 10 can be trained with other image datasets and successfully generalize to achieve phase recovery for new types of input test images/optical fields 12, and (2) the richness of the phase variations in the training images impacts the performance and generalization capability of the QPI diffractive network 10; for example, the QPI diffractive network 10 trained with Tiny-Imagenet achieved relatively better generalization to new phase images obtained from CIFAR-10 test dataset when compared to the QPI diffractive network 10 trained with Fashion-MNIST image data. To further quantify the generalization performance of the presented QPI diffractive network 10 shown in FIG. 4A (trained with Tiny-Imagenet), was blindly tested with phase images of thin Pap (Papanicolaou) smear samples as the input optical field 12 as shown in FIGS. 13A-13D. Although this QPI diffractive network 10 was only trained using the phase-encoded images from Tiny-Imagenet, it very well generalized to new types of samples, performing quantitative phase retrieval and QPI on the phase images 12 of thin Pap smear samples, with output SSIM and PSNR values of 0.663±0.047 and 25.55 dB±1.44, respectively (see FIGS. 13A-13D).

Figure 7:
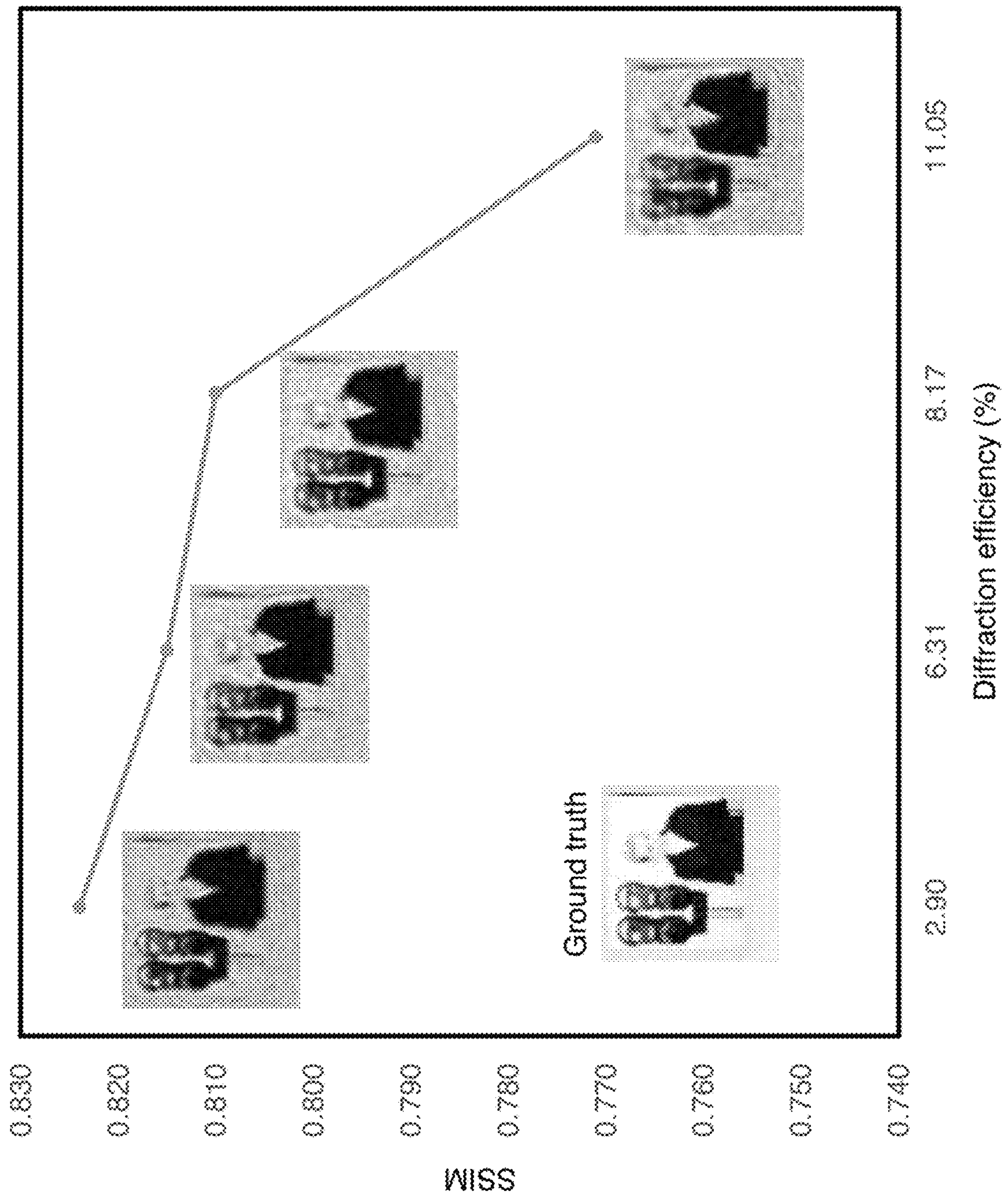
FIG. 7 illustrates the trade-offs between diffractive QPI signal quality and the power efficiency. Four (4) different diffractive QPI network models were trained using [0:π] phase-encoded samples from the Tiny-Imagenet dataset. The SSIM on the y-axis reflects the mean value computed over the entire 10K test images of the Tiny-Imagenet dataset. The diffractive QPI network that provides the highest SSIM is the network shown in FIG. 4A, which was trained solely based on the structural loss function (Eq. 5) totally ignoring the diffraction efficiency of the resulting solution. The loss function used for the training of the other three (3) diffractive QPI networks includes a linear superposition of the structural loss function (Eq. 5) and the diffraction efficiency penalty term depicted in Eq. 7. The multiplicative constant $\gamma$ which determines the weight of the diffraction efficiency penalty was taken as 0.1, 0.4 and 5.0 for these three (3) diffractive QPI networks, providing an output diffraction efficiency of 6.31%, 8.17% and 11.05%, respectively.

The output power efficiency of the presented QPI networks 10 is mainly affected by two factors: diffraction efficiency of the resulting network and material absorption. Here, it was assumed that the optical material of diffractive surfaces or layers 20 has a negligible loss for the wavelength of operation, similar to the properties of optical glasses, e.g., BK-7, in the visible part of the spectrum. Beyond the material absorption, another possible source of power loss in a physically implemented diffractive network 10 is surface back-reflections, which might potentially be minimized through e.g., anti-reflection thin-film coatings. For example, the diffractive QPI network 10 reported in FIG. 4A achieves ~2.9% mean diffraction efficiency for the entire 10K test set of Tiny-Imagenet. It is important to note that during the training of this diffractive QPI network 10, the training cost/loss function was purely based on decreasing the QPI errors at the output plane, and there was no other loss term or regularizer to enforce a more power-efficient operation. In fact, by including an additional loss term for regulating the balance between the QPI performance and diffraction efficiency (see Methods section), it was demonstrated that it is possible to design more efficient diffractive QPI networks 10 with a minimal compromise on the output image quality; see FIG. 7, where all the diffractive network designs share the same physical layout shown in FIG. 4A. For example, a more efficient diffractive QPI network 10 design with 6.31% power efficiency at the output plane offers QPI signal quality with an SSIM of 0.815±0.0491. Compared to the original diffractive QPI network 10 design that solely focuses on output image quality, the SSIM value of this new diffractive QPI network 10 has a negligible decrease while its diffraction efficiency at the output plane is improved by more than 2-fold. Further shifting the focus of the QPI network 10 training towards improved power efficiency can result in a solution that can synthesize QPI signals or output images or patterns 16 with >11% output diffraction efficiency, also achieving an SSIM of 0.771±0.0507 (see FIG. 5). It should be noted here that a standard phase contrast microscope also contains some filters, apertures, lenses and other optical components that block and/or scatter the sample light, all of which also cause some power loss. However, such conventional optical components have well-established fabrication technologies supporting their optimized use in a microscope design. With advances in diffractive optical computing, more efficient diffractive surface designs can be enabled in the future to further increase the output diffraction efficiencies of diffractive QPI networks 10.

Figure 14A:
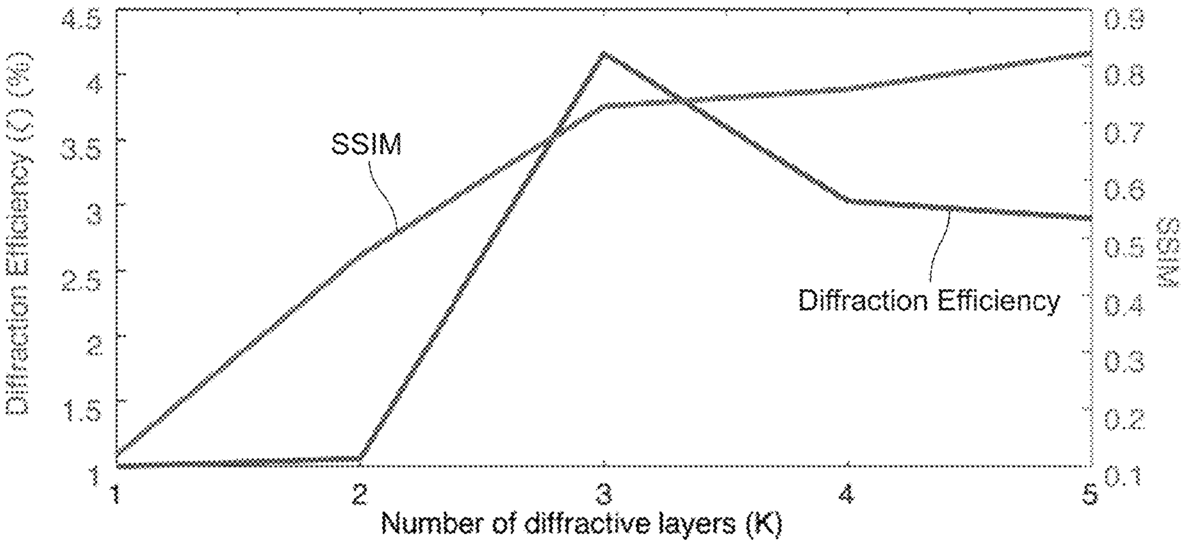
FIGS. 14A-14B show the impact of the number (K) of trainable layers on the diffractive QPI signal quality and the output diffraction efficiency.
Figure 14B:
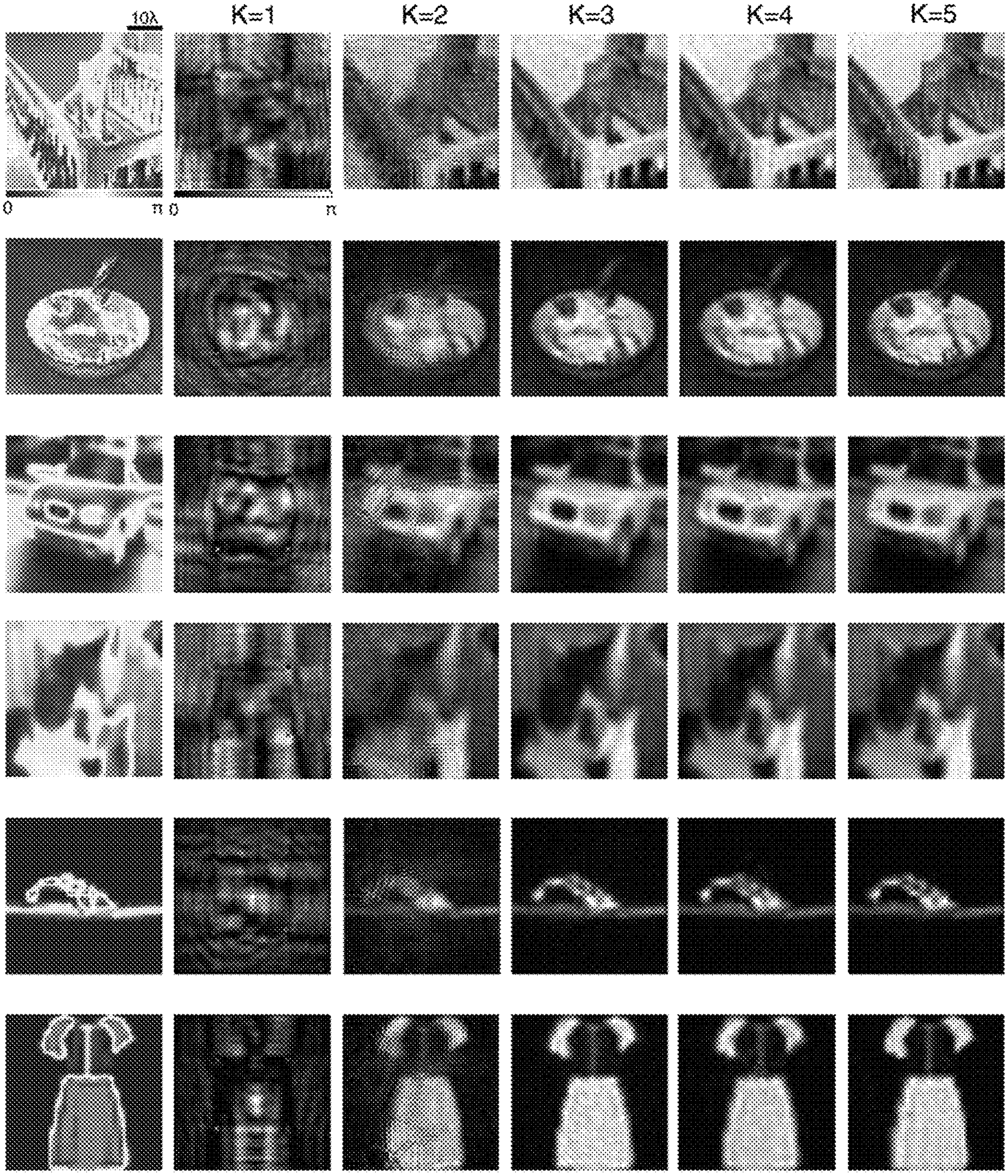

Another crucial parameter in a diffractive network design is the number of diffractive layers within the system; FIGS. 14A-14B illustrate the results of the analysis on the relationship between the diffractive QPI performance and the number of diffractive layers 20 within the QPI network 10. It has previously been shown through both theoretical and empirical evidence that deeper diffractive optical networks can compute an arbitrary complex-valued linear transformation with lower approximation errors, and they demonstrate higher generalization capacity for all-optical statistical inference tasks. FIGS. 14A-14B confirms the same behavior: improved QPI performance is achieved by increasing the number of diffractive layers, K. When K=1, the trained diffractive QPI network 10 fails to compute the QPI signal or output image or pattern 16 for a given input phase object 14, as evident from the extremely low SSIM values and the exemplary images shown in FIG. 14B. On top of that, the diffraction efficiency is also very low, ~1%, with a single-layer diffractive QPI network configuration (K=1). With K=2 trainable diffractive surfaces, the diffraction efficiency stays very low, while the QPI signal or output image 16 quality improves. When there are K=3 diffractive layers in the QPI network design, a significant improvement in both the diffraction efficiency and the output SSIM is observed compared to K=1 or 2. Beyond K=3, the structural quality of the output QPI signal or output image 16 keeps improving as more layers 20 are added to the diffractive network architecture. However, this improvement does not translate into better diffraction efficiency as the training loss function does not include a power efficiency penalty term. Earlier results reported in FIG. 7 clearly show the impact of adding such a regularizer term in the training loss function for improving the diffraction efficiency of the QPI network, reaching >11% power efficiency with a minor sacrifice in the structural fidelity of the output images.

Figure 15:
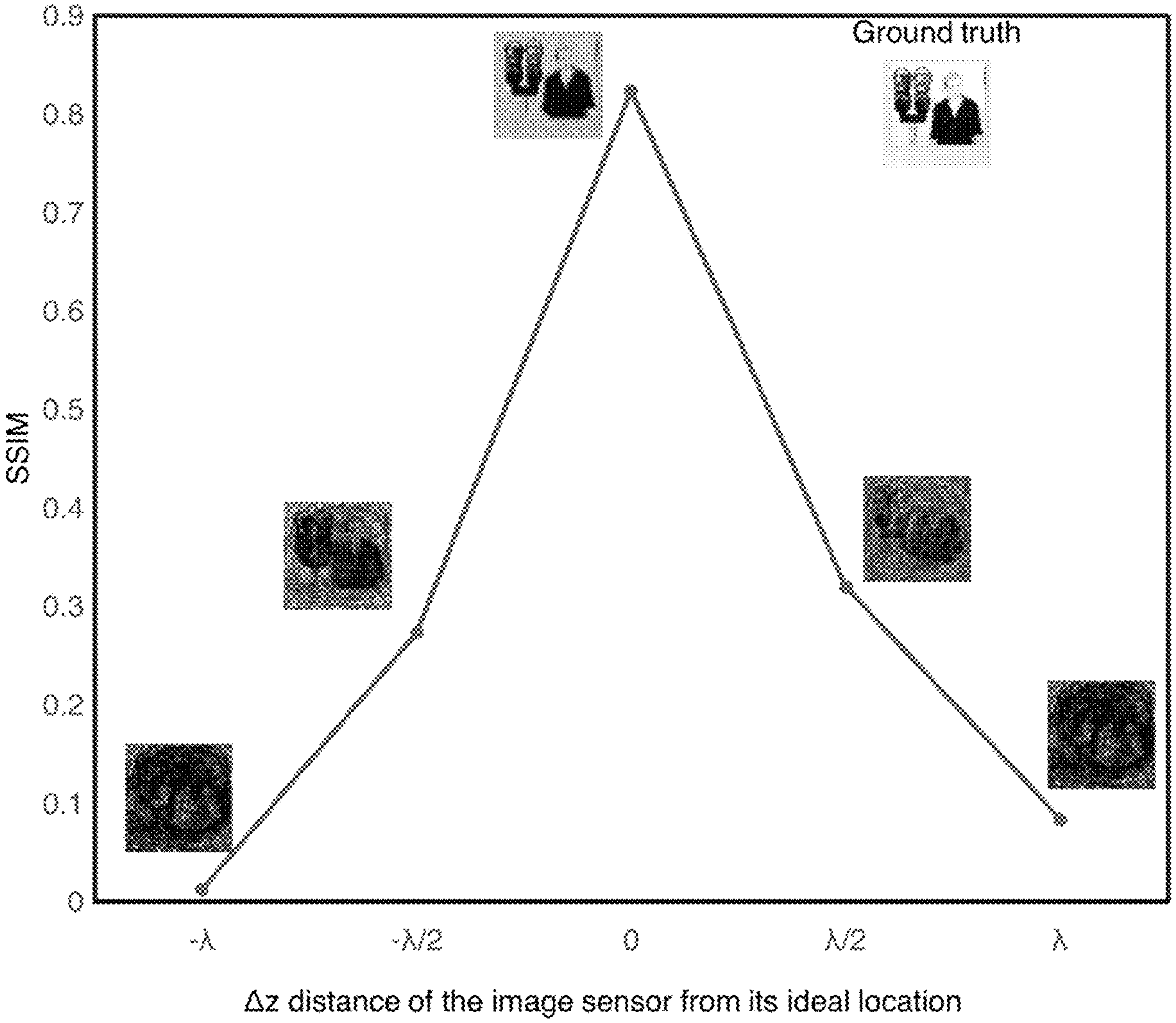
FIG. 15 illustrates the impact of the misalignment of the image sensor plane with respect to the QPI diffractive layers. The optical forward model of the QPI diffractive network shown in FIG. 4A is modified with the addition of an axial misalignment ($\Delta z$) of the image sensor plane with respect to its ideal location.
Figure 16:
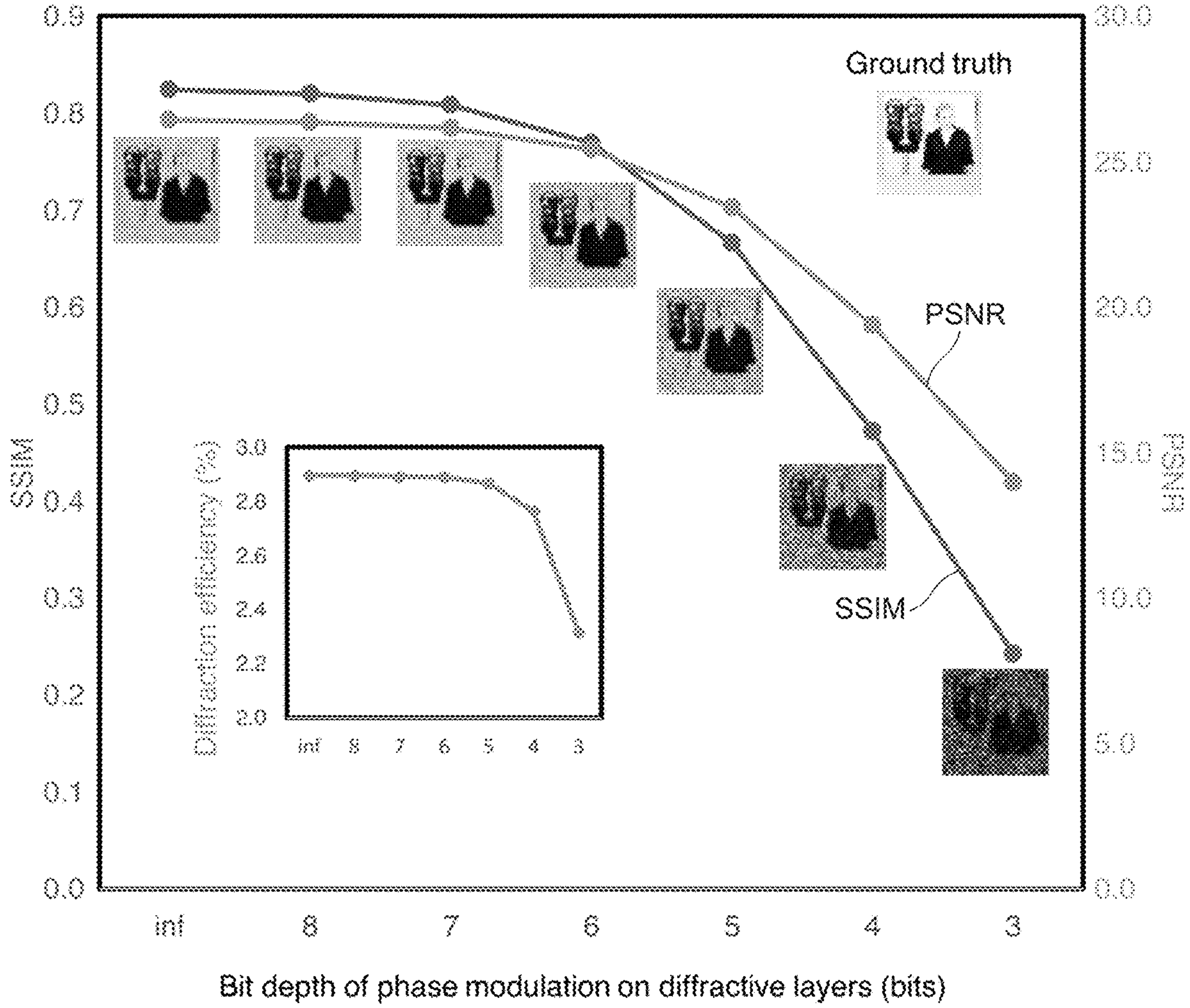
FIG. 16 illustrates the impact of the bit depth of the phase modulation over the diffractive surfaces on the quality of the output QPI signals. The forward training model of the QPI diffractive network shown in FIG. 4A assumes continuous phase modulation at the diffractive layers, corresponding to infinite (inf) bit-depth. The image degradation brought by limited bit depth of the phase modulation over the diffractive surfaces was quantified. 8- and 7-bit phase modulation cases approximately match the performance of their continuous counterpart.

It is also important to note that as the number of diffractive layers 20 increases, the system (if the diffractive QPI network 10 is not trained accordingly) becomes more sensitive to physical misalignments that might be induced through e.g., fabrication and/or mechanical errors. To shed further light on this, the sensitivity of the QPI diffractive network 10 shown in FIG. 4A was tested against axial misalignments of the image sensor 28 at the output plane with respect to the diffractive layers 20. As shown in FIG. 15, the SSIM and PSNR values of the all-optical QPI signal or output image 16 exhibit a decrease when the output image sensor 28 is placed at a different axial location than the correct position assumed in the design of the QPI diffractive network 10. However, one can introduce misalignment resilient diffractive designs with the incorporation of "vaccination" in the training of the diffractive network 10, where such misalignments are randomly introduced during the training process, guiding the optimization of the diffractive surfaces to build resilience toward uncontrolled misalignments. For example, using this vaccination strategy, it has been shown that diffractive networks can be trained to provide an extended depth-of-field, mitigating performance degradation due to object and/or sensor plane misalignments. The incorporation of such vaccination methods into the training of diffractive QPI networks 10 would in general result in more robust designs against misalignments. Beyond misalignments, another practical issue regarding the implementation of diffractive QPI systems that needs to be discussed is the bit depth of the phase modulation on the diffractive layers 20. During the training of the QPI diffractive networks 10, it was assumed that the phase modulation over a diffractive surface can take any value in the range $[0,2\pi]$. After its training, when tested under different bit depths of diffractive phase modulation, the diffractive QPI network 10 shown in FIG. 4A could very well maintain its QPI performance at the output plane with 6-, 7- or 8-bits of phase quantization, as shown in FIG. 16.

Although the diffractive networks 10 analyzed and presented herein are designed to achieve the QPI task with unit magnification, this is not a limitation of the underlying framework. Depending on the targeted spatial resolution, imaging field-of-view and throughput, diffractive QPI networks 10 with a magnification larger than 1 can also be devised according to the pixel size and the active area of the desired focal-plane-array at the output plane captured by the image sensor 28. With the wide availability of modern CMOS image sensor technology that has sub-micron pixel sizes, unit magnification imaging systems provide a fine balance between the sample field-of-view and the spatial resolution that can be achieved; therefore, unit magnification imaging systems enable compact and chip-scale microscopy tools that provide a substantial increase in the sample field-of-view and volume that can be probed with a decent spatial resolution. In this respect, the presented QPI diffractive networks 10 can be integrated with standard CMOS image sensor 28 chips, operating at e.g., visible and near infrared wavelengths, and the designed diffractive layers 20 that are closely spaced can be monolithically fabricated using e.g., two-photon polymerization-based 3D nano-fabrication methods and incorporated on the same platform as the image sensor 28. Such on-chip diffractive designs, illuminated by e.g., a compact laser diode as the illumination source 18, would also make it easier to align the monolithically fabricated diffractive layers 20 with respect to the output plane, owing to the small pixel size of standard CMOS image sensors 28.

In summary, the presented diffractive QPI networks 10 convert the phase information of an input object 14 into an intensity distribution or output image 16 at the output plane in a way that the normalized output intensity reveals the phase distribution of the object 14 in radians. Being resilient to input light intensity variations and power efficiency changes in the diffractive set-up, this QPI network 10 can replace the bulky lens-based optical instrumentation and the computationally intensive reconstruction algorithms employed in QPI systems, potentially offering high-throughput, low-latency, compact and power-efficient QPI platforms which might fuel new applications in on-chip microscopy and sensing. In addition, depending on the application, they can also be trained to all-optically perform various machine learning tasks (e.g., image segmentation and phase unwrapping) using the phase information channel describing transparent input objects 14; they can also be integrated with electronic back-end neural networks to enable multi-task, resource-efficient hybrid machine learning systems. Fabrication and assembly of such diffractive QPI systems operating in the visible and near IR wavelengths can be achieved using two-photon polymerization-based 3D printing methods as well as optical lithography tools.

Methods

Optical Forward Model of Diffractive QPI Networks

The optical wave propagation in air, between successive diffractive layers, was formulated based on the Rayleigh-Sommerfeld diffraction equation. According to this formulation, the free-space propagation inside a homogeneous and isotropic medium is modeled as a shift-invariant linear system with the impulse response, $$w(x, y, z) = \frac{z}{r^2}\left(\frac{1}{2\pi r} + \frac{n}{j\lambda}\right)\exp\left(\frac{j2\pi nr}{\lambda}\right) \quad (1)$$

where $r=\sqrt{x^2+y^2+z^2}$. In Eq. 1, the parameters n and $\lambda$ denote the refractive index of the medium (n=1 for air), and the wavelength of the illumination light, respectively. Accordingly, a diffractive neuron, i, located at $(x_i,y_i,z_i)$ on $k^{th}$ layer can be considered as the source of a secondary wave, $u_i^k(x,y,z)$, $$u_i^k(x, y, z) = w_i(x, y, z)t(x_i, y_i, z_i)\sum_{q=1}^{N} u_q^{k-1}(x_i, y_i, z_i). \quad (2)$$

where the summation in Eq. 2 represents the field generated over the diffractive neuron located at $(x_i,y_i,z_i)$ by the neurons on the previous, $(k-1)^{th}$, layer. From Eq. 1, the function $w_i(x,y,z)$ in Eq. 2 can be written as, $$w_i(x, y, z) = \frac{z - z_i}{r^2}\left(\frac{1}{2\pi r} + \frac{n}{j\lambda}\right)\exp\left(\frac{j2\pi nr}{\lambda}\right), \quad (3)$$

with $r=\sqrt{(x-x_i)^2+(y-y_i)^2+(z-z_i)^2}$. The multiplicative term $t(x_i,y_i,z_i)$ in Eq. 2 denotes the transmittance coefficient/parameter of the neuron, i, which, in its general form, can be written as, $t(x_i,y_i,z_i)=\alpha_i \exp(j\theta_i)$. Depending on the diffractive layer 20 fabrication method and the related optical materials, both $\alpha_i$ and $\theta_i$ might be a function of other physical parameters, e.g., material thickness in 3D printed diffractive layers 20 and driving voltage levels in spatial light modulators. In earlier works on diffractive networks, it has been shown that it is possible to directly train such physical parameters through deep learning. On the other hand, a more generic way of optimizing a diffractive network is to define the amplitude $\alpha_i$ and $\theta_i$ as learnable parameters. Here, the analysis was constrained to phase-only diffractive surfaces where the amplitude coefficients, $\alpha_i$, were all taken as 1 during the entire training. Thus, the only learnable parameters of the presented diffractive QPI networks 10 are the phase shifts applied by the diffractive features, $\theta_i$. For all the diffractive QPI networks 10 that were trained, the initial value of all $\theta_i$s was set to be 0, i.e., the initial state of a diffractive network (before the training kicks in) is equal to the free-space propagation of the input light field onto the output plane.

The Design of Diffractive QPI Networks

During the deep learning-based diffractive network training, the 2D space with a period of 0.53λ was sampled, which is also equal to the size of each diffractive feature ('neuron') on the diffractive layers 20. Although the forward optical model over continuous functions were described in the previous subsection, training of the presented diffractive QPI networks 10 was performed using digital computers. Hence, the input and output signals are denoted using their discrete counterparts for the remaining part of this subsection with a spatial sampling period of 0.53λ in both directions (x and y). In the physical layout of the presented diffractive QPI networks 10, the size of the input field-of-view was set to be 42.4λ×42.4λ, which corresponds to 80×80 2D vectors defining the phase distributions of input objects 14. With I[m,n] denoting an image of size M×N from a dataset, a 2D linear interpolation was applied to compute the 2D vector ϕ[q,p] of size 80×80. Note that the values of M and N depend on the used image dataset. Specifically, for Tiny-Imagenet M=N=64, while for CIFAR-10 and Fashion-MNIST datasets, M=N=32 and M=N=28, respectively. The scattering function within the input field-of-view of the diffractive networks was defined as a pure phase function (see FIG. 1) in the form of $e^{j\alpha\pi\phi[q,p]}$.

The physical dimensions of each diffractive layer 20 were set to be 106λ on both x and y axes, i.e., each diffractive layer contains 200×200=40K neurons. For instance, the 5-layer diffractive QPI network 10 shown in FIG. 4A has 0.2 million neurons, and hence 0.2 million trainable parameters, $\theta_i$, i=1, 2, . . . , $0.2\times10^6$. In the forward optical model, all the distances were set between (1) the first diffractive layer 20 and the input field-of-view, (2) two successive diffractive layers 20, and (3) the last diffractive layer 20 and the output plane, as 40λ resulting in an NA of ~0.8. With the size of each diffractive feature/neuron taken as 0.53λ, the diffraction cone angle of the secondary wave emanating from each neuron ensures optical communication between all the neurons on two successive layers 20 (axially separated by 40λ), while also enabling a highly compact diffractive QPI network design. For instance, the total axial distance from the input field-of-view of the input optical field 12 to the output plane with the intensity image 16 of a 5-layer diffractive QPI network 10 shown in FIG. 1 is only ~240λ.

The size of the QPI signal area at the output plane including the reference/background region was set to be 43.56λ×43.56λ, i.e., the reference region extends on both directions on x and y axes by 0.53λ, (43.56λ=42.4λ+2×0.53λ). If one denotes the background optical intensity over this reference region as $I_R$[r] and the optical intensity within the QPI signal region as $I_S$[q,p], then according to the forward model, $I_{QPI}$[q,p] is found by, $$I_{QPI}[q,p] = \frac{I_s[q,p]}{B}, \text{ where} \quad (4)$$

$$B = \frac{1}{N_R}\sum_{r=1}^{N_R} I_R[r]$$

is the mean background intensity value, $N_R$ denotes the number of discretized intensity samples within the reference region. According to Eq. 4, for a given input object/sample, the final diffractive QPI signal, $I_{QPI}$[q,p] reports the output phase image in radians.

To guide the evolution of the diffractive layers 20 according to the QPI signal or output image 16 in Eq. 4, at each iteration of the deep learning-based training of the presented diffractive QPI networks, the phase parameters, $\theta_i$, were updated using the following normalized mean-squared-error, $$\mathcal{L} = \frac{1}{N_R+N_S}\sum_{l=1}^{N_R+N_S} |o[l]-\sigma o'[l]|^2, \quad (5)$$

where, $N_s$ is the total number of discretized samples representing the QPI signal area, i.e., $N_s$=80×80. The vectors o and o' are 1D counterparts of the associated 2D discrete signals, o[q,p] and o'[q,p], computed based on lexicographically ordered vectorization operator. They denote the ground-truth phase signal of the input object and the diffractive intensity signal synthesized by the QPI network 10 at a given iteration, respectively. Both the ground truth vector, o, and o' cover the output sample field-of-view and the reference signal region surrounding it, hence their size is equal to $N_R+N_S$=82×82. The 2D vector o[q,p] is defined based on the input vector ϕ[q,p]. First, the size of the two vectors were equalized by padding the 80×80 vector ϕ[q,p] to the size 82×82. The values over the padded region are equal to $$\frac{1}{\alpha\pi}$$

This padded vector was then scaled with the multiplicative constant απ such that the 80×80 part in the middle represents the argument of the phase function $e^{j\alpha\pi\phi[q,p]}$. The reference signal region surrounding this 80×80 part has all ones, implying that the mean intensity over this area will correspond to 1 rad. By computing the loss function in Eq. 5 based on a ground-truth vector that also includes the desired reference signal intensity, this implicitly enforces/trains the diffractive QPI network 10 to synthesize a uniformly distributed intensity over the reference signal area, although this is not a requirement for the QPI networks' operation.

The multiplicative term, σ, in Eq. 5 is a normalization constant that was defined as, $$\sigma = \frac{\frac{1}{N_R+N_S}\sum_{l=1}^{N_R+N_S} o[l]o'^*[l]}{\frac{1}{N_R+N_S}\sum_{l=1}^{N_R+N_S} |o'[l]|^2}, \quad (6)$$

The structural loss function, $\mathcal{L}$, in Eq. 5 drives the QPI quality, and it was the only loss term used during the training of the diffractive networks shown in FIG. 4A, FIGS. 12A-12B; 13A-13B. The training of the diffractive network designs with output diffraction efficiencies of ≥2.9% shown in FIG. 7, on the other hand, use a linear mix of the structural loss in Eq. 5 and an additional loss term penalizing poor power efficiency, i.e., $\mathcal{L}'=\mathcal{L}+\gamma\mathcal{L}_p$. The functional form of the power efficiency-related penalty $\mathcal{L}_p$ was defined as, $$\mathcal{L}_p = e^{-\eta}, \quad (7)$$

where η stands for the percentage of power efficiency, $$\eta = \frac{P_{out}}{P_1} \times 100, \tag{8}$$

with $P_1$ denoting the optical power incident on the $1^{st}$ diffractive layer and $$P_{out} = \sum_{l=1}^{N_R+N_S} |o'[l]|^2.$$

The coefficient $\gamma$ is a multiplicative constant that determines the weight of the power efficiency-related term in the total loss, $\mathcal{L}'$. The value of $\gamma$ directly affects the diffraction efficiency of the resulting diffractive QPI network design. Specifically, for the diffractive network shown in FIG. 4A, it was set to be 0. On the other hand, when $\gamma$ was taken as 0.1, 0.4 and 5.0, the corresponding diffractive QPI network designs achieved 6.31%, 8.17% and 11.05% diffraction efficiency ($\eta$), respectively (see FIG. 7).

Implementation Details of Diffractive QPI Network Training

The deep learning-based diffractive QPI network training was implemented in PYTHON® (v3.7.7) and TENSORFLOW® (v1.15.0, Google Inc.) software 34. For the gradient-based optimization, the Adam optimizer was used with its momentum parameter $\beta_1$ set to 0.5. The learning rate was taken as 0.01 for all the presented diffractive QPI networks 10. With the batch size equal to 75, all the diffractive QPI networks 10 were trained for 200 epochs, which takes ~40 hours using a computer 30 with a Geforce GTX® 1080 Ti GPU (Nvidia Inc.) and Intel® Core™ i7-8700 Central Processing Unit 32 (CPU, Intel Inc.) with 64 GB of RAM, running WINDOWS® 10 operating system (Microsoft). To avoid any aliasing in the representation of the free-space impulse response depicted in Eq. 1, the dimensions of the simulation window were taken as 1024×1024.

The PSNR image metric was calculated as follows:

$$PSNR = 20\log_{10}\left(\frac{a\pi}{\sqrt{|\alpha\pi\phi[q, p] - I_{QPI}[q, p]|^2}}\right), \tag{9}$$

For SSIM calculations, the built-in function in Tensorflow, i.e., tf.image.ssim, was used where the two inputs were $\alpha\pi\phi[q,p]$ and $I_{QPI}[q,p]$, representing the ground-truth image and the QPI signal synthesized by the diffractive network, respectively. The input parameter "max_val" was set to be an in these SSIM calculations. It should be noted that for all the images used in performance quantification, the SSIM and PSNR metrics were computed over the same output field-of-view, which is approximately 42.4λ×42.4λ.

While embodiments of the present invention have been shown and described, various modifications may be made without departing from the scope of the present invention. The invention, therefore, should not be limited, except to the following claims, and their equivalents.

What is claimed is:

1. A diffractive Quantitative Phase Imaging (QPI) network for imaging a phase object or a sample containing a phase distribution or phase information comprising:

one or more optically transmissive and/or reflective substrate layer(s) arranged in an optical path, each of the optically transmissive and/or reflective substrate layer (s) comprising a plurality of physical features formed on or within the one or more optically transmissive or reflective substrate layer(s) and having different transmission and/or reflection coefficients or parameters as a function of the lateral coordinates across each substrate layer, wherein the one or more optically transmissive and/or reflective substrate layer(s) and the plurality of physical features thereon collectively define a trained mapping function between an input optical field from the phase object or the sample to an output intensity image created by optical diffraction through the optically transmissive layer(s) and/or from the reflective substrate layer(s);

an image sensor configured to capture the output intensity image; and wherein the one or more optically transmissive and/or reflective substrate layer(s) are designed during a digital training phase to define the plurality of physical features formed on or within the one or more optically transmissive or reflective substrate layer(s) such that the output intensity image reveals the quantitative phase information of the input optical field created by optical diffraction through the optically transmissive substrate layer(s) and/or diffraction from the reflective substrate layer(s).

2. The diffractive QPI network of claim 1, wherein the number of optically transmissive and/or reflective substrate layer(s) is between 1 and 10.

3. The diffractive QPI network of claim 1, wherein the training phase comprises training on images that are phase encoded within a pre-defined phase range.

4. The diffractive QPI network of claim 1, wherein the output intensity image comprises a normalized intensity image normalized with a mean intensity value surrounding an output intensity image field of view.

5. The diffractive QPI network of claim 1, wherein the output intensity image reports a quantitative phase distribution of the input optical field in radians.

6. The diffractive QPI network of claim 1, wherein the input optical field comprises light within visible or near-infrared parts of an electromagnetic spectrum.

7. The diffractive QPI network of claim 1, wherein the phase object comprises an object where an amplitude transmission or a reflection coefficient or parameter is substantially equal to 1.0 or another constant.

8. A method of performing quantitative phase imaging comprising:

inputting an optical field of a phase object or sample containing a phase distribution or phase information into a diffractive Quantitative Phase Imaging (QPI) network comprising:

one or more optically transmissive and/or reflective substrate layer(s) arranged in an optical path, each of the optically transmissive and/or reflective substrate layer(s) comprising a plurality of physical features formed on or within the one or more optically transmissive or reflective substrate layer(s) and having different transmission and/or reflection coefficients or parameters as a function of lateral coordinates across each substrate layer, wherein the one or more optically transmissive and/or reflective substrate layer(s) and the plurality of physical features thereon collectively define a trained mapping function between an input optical field from the phase object or sample to an output intensity image created by optical diffraction through the optically transmissive substrate layer(s) and/or diffraction from the reflective substrate layer(s);

wherein the one or more optically transmissive and/or reflective substrate layer(s) are designed during a digital training phase to define the plurality of physical features formed on or within the one or more optically transmissive or reflective substrate layer(s) such that the output intensity image reveals quantitative phase information of the input optical field created by optical diffraction through the optically transmissive substrate layer(s) and/or from the reflective substrate layer(s); and capturing the output intensity image with an image sensor.

9. The method of claim 8, wherein the number of optically transmissive and/or reflective substrate layer(s) is between 1 and 10.

10. The method of claim 8, wherein the training phase comprises training on images that are phase encoded within a pre-defined phase range.

11. The method of claim 8, wherein the output intensity image comprises a normalized intensity image normalized with a mean intensity value surrounding an output intensity image field of view.

12. The method of claim 8, wherein the output intensity image reports a quantitative phase distribution of the input optical field in radians.

13. The method of claim 8, wherein the input optical field comprises light within visible or near-infrared parts of an electromagnetic spectrum.

14. The method of claim 8, wherein the phase object comprises an object where an amplitude transmission or a reflection coefficient or parameter is substantially equal to 1.0 or another constant.

15. The method of claim 8, wherein the QPI network is invariant to changes in an intensity of the optical field input to the QPI network.

* * * * *